US006728656B2

(12) United States Patent
Suzuki

(10) Patent No.: US 6,728,656 B2
(45) Date of Patent: Apr. 27, 2004

(54) LENS FRAME SHAPE MEASURING APPARATUS

(75) Inventor: Yasuo Suzuki, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 202 days.

(21) Appl. No.: 09/907,627

(22) Filed: Jul. 19, 2001

(65) Prior Publication Data

US 2002/0046000 A1 Apr. 18, 2002

(30) Foreign Application Priority Data

Jul. 19, 2000 (JP) .................................... 2000-218929
Sep. 21, 2000 (JP) .................................... 2000-286393

(51) Int. Cl.$^7$ ................................................ G01B 11/24
(52) U.S. Cl. .................................... 702/168; 33/200
(58) Field of Search ........................ 33/200, 28, 507, 33/551; 356/601, 623; 451/5, 43, 159; 700/164, 95; 702/168

(56) References Cited

U.S. PATENT DOCUMENTS 5,138,770 A * 8/1992 Matsuyama .................... 33/28
6,263,583 B1 * 7/2001 Mizuno ......................... 33/28
6,325,700 B1 * 12/2001 Mizuno et al. ................ 451/8
6,473,977 B1 * 11/2002 Kujawa ........................ 33/28

* cited by examiner

Primary Examiner—John Barlow
Assistant Examiner—Stephen J. Cherry
(74) Attorney, Agent, or Firm—Finnegan, Henderson, Farabow, Garrett and Dunner, L.L.P.

(57) ABSTRACT

A lens frame shape measuring apparatus wherein a contact element 216 supported by a contact element moving mechanism is brought into abutment against a groove formed in an inner peripheral surface of a lens frame LF (RF) of a glasses frame MF and is moved along the said groove to measure the shape of the lens frame 272 by a moving position of the contact element 216, the apparatus comprising a radius vector measuring means 217 for detecting a moving distance of the contact element 216 when the contact element is moved from a movement start position P1 at the center of the lens frame 272 up to a central position Rm1 in the right and left direction of a lower rim 272a of the lens frame 272 and is brought into contact with the lower rim 272a, and a measurement control means which identifies a lens frame shape of the glasses frame MF by the moving distance detected by the radius vector measuring means 217 and which controls a contact measurement state of the contact element 216 for the lens frame 272 in accordance with a measurement sequence corresponding to the thus-identified lens frame shape.

10 Claims, 29 Drawing Sheets

LENS FRAME SHAPE MEASURING APPARATUS

BACKGROUND OF THE INVENTION

1. Field of the Invention

The present invention relates to a lens frame shape measuring apparatus for measuring the shape of a lens frame of glasses.

2. Description of the Prior Art

Conventionally there has been invented a lens frame shape measuring apparatus in which a contact element is brought into abutment against a groove formed in a lens frame of glasses to measure the shape of the lens frame.

According to a conventional lens frame shape measuring apparatus of this type, a lower end of a U-shaped arm is integral with an upper end of a vertically extending rotary shaft, a contact element is provided at an upper end of the arm, the contact element and the rotary shaft are urged together toward a lens frame groove by means of a spring, thereby allowing the contact element to abut the lens frame groove at a predetermined pressure, and at the same time the rotary shaft is rotated in the same direction at a predetermined certain speed, thereby allowing the contact element to rotate along the lens frame groove.

There are certain lens frames which are narrow in rim width in a direction perpendicular to an optical axis of a lens of glasses and are therefore easily deformed under the action of an external force. There is a known lens frame for half glasses (called "Kanime lenses" in Japanese) whose vertical width is extremely narrow when seen from the front side for example. A certain lens frame for half glasses is narrow in rim width and is easily deformed as noted above.

Therefore, when the shape of a lens frame for half glasses narrow in rim width and apt to be deformed is measured by the foregoing lens frame shape measuring apparatus, a nose contacting side or an ear contacting side of the lens frame for half glasses will be deformed if the rotating speed and direction of the contact piece are approximately constant as noted above, thus giving rise to the problem that an exact shape of the lens frame for half lenses cannot be measured.

In this measurement, the deformation of the lens frame for half lenses is conspicuous particularly on the ear contacting side and it is a largely protruding deformation to the outside in comparison with a normal shape, thus making it impossible to obtain exact data on the lens frame shape.

Therefore, when it is taken into account that the measurement must also cover measuring the shape of such a lens frame for half glasses which is narrow in rim width and is apt to undergo deformation, it is difficult to realize a complete automation of the lens frame shape measurement with use of the lens frame shape measuring apparatus.

SUMMARY OF THE INVENTION

Accordingly, it is the first object of the present invention to provide a lens frame shape measuring apparatus wherein the shape of a lens frame of glasses is identified on the basis of the distance from a movement start position of a contact element at a lens frame center up to a lens frame measurement start position at which the contact element is first brought into abutment against the lens frame, i.e., a vertical moving distance of the contact element as seen from the front side of the lens frame in the measurement, and can be used in judging whether contact measurement conditions such as rotating speed and direction of the contact element should be changed or not (a lens frame shape measuring sequence is to be changed or not), and which can realize a complete automation of lens frame measurement without human assistance.

According to the present invention, for achieving the above-mentioned object, there is provided a lens frame shape measuring apparatus wherein a contact element supported by a contact element moving mechanism is brought into abutment against a groove formed in an inner peripheral surface of a lens frame of glasses and is moved along the said groove to measure the shape of the lens frame by a moving position of the contact element, the apparatus comprising a contact element moving distance detecting means for detecting a moving distance of the contact element when the contact element is moved from a movement start position at the center of the lens frame up to a central position in the right and left direction of a lower rim of the lens frame and is brought into contact with the lower rim, and a measurement control means which identifies a lens frame shape of the glasses by the moving distance detected by the contact element moving distance detecting means and which controls a contact measurement state of the contact element for the lens frame in accordance with a measurement sequence corresponding to the thus-identified lens frame shape.

The contact element moving mechanism may comprise a slide base capable of moving forward and backward horizontally, a measuring section moving motor for moving the slide base forward and backward horizontally, a rotary base held by the slide base horizontally rotatably, a base rotating motor for rotating the rotary base, an upper slider mounted to the rotary base so as to be movable forward and backward horizontally and holding the contact element vertically movably, and a spring which urges the upper slider in either the forward direction or the backward direction, and the measurement control means may control the operation of the base rotating motor and thereby control the state of movement of the contact element for the lens frame as the foregoing contact measurement state in accordance with the measurement sequence corresponding to the identified lens frame shape.

It is the second object of the present invention to provide a lens frame shape measuring apparatus wherein the rotating speed and direction of a contact element can be changed at a portion of a lens frame shape of glasses at which portion the radius of curvature varies largely and a contact pressure between the contact element and the lens frame is large.

For achieving this object, the contact element moving mechanism comprises a slide base capable of moving forward and backward horizontally, a measuring section moving motor for moving the slide base forward and backward horizontally, a rotary base held by the slide base horizontally rotatably, a base rotating motor for rotating the rotary base, a lower slider mounted to the rotary base horizontally movably, a drive motor for moving the lower slider forward and backward horizontally, an upper slider mounted to the rotary base so as to be movable forward and backward horizontally and holding the contact element vertically movably, and a spring which urges the upper slider in either the forward direction or the backward direction, and the measurement control means may control the operation of the drive motor and thereby control a contact pressure of the contact element against the lens frame as the foregoing contact measurement state in accordance with the measurement sequence corresponding to the identified lens frame shape.

The contact element moving mechanism may comprise a slide base capable of moving forward and backward horizontally, a measuring section moving motor for moving the slide base forward and backward horizontally, a rotary base held by the slide base horizontally rotatably, a base rotating motor for rotating the rotary base, a lower slider mounted to the rotary base horizontally movably, a drive motor for moving the lower slider forward and backward horizontally, an upper slider mounted to the rotary base so as to be movable forward and backward horizontally and holding the contact element vertically movably, and a spring which urges the upper slider in either the forward direction or the backward direction, and the measurement control means may control the operation of the base rotating motor and thereby control the state of movement of the contact element for the lens frame as the foregoing contact measurement state in accordance with the measurement sequence corresponding to the identified lens frame shape, and at the same time the measurement control means may control the operation of the drive motor and thereby may control a contact pressure of the contact element for the lens frame as the foregoing contact measurement state in accordance with the measurement sequence corresponding to the identified lens frame shape.

Further, the measurement control means may identify the lens frame to be a lens frame for half glasses when the moving distance detected by the contact element moving distance detecting means is smaller than a preset value.

Further, the measurement control means may be constructed such that when it judges that the lens frame is a lens frame for half glasses, it controls to decrease the rotating speed of the contact element relative to the rotating speed thereof for normal lens frame measurement, thereby creating a contact measurement state in which the contact element does not exert an abrupt deforming force on the lens frame when the measuring element moves along and in contact with the lens frame.

Further, the measurement control means may be constructed such that when it judges the lens frame to be a lens frame for half glasses, it controls to decrease the rotating speed of the contact element at a position on a nose or ear contacting side of the lens frame of glasses, thereby creating a contact measurement state in which an abrupt deforming force is not exerted on the lens frame when the contact element moves in contact with the lens frame at a position on the nose or ear contacting side of the lens frame of glasses.

It is the third object of the present invention to provide a lens frame shape measuring apparatus wherein, in the case of a lens frame for half glasses having an extremely narrow width in the vertical direction as seen from the front side of the lens frame for example and having a narrow rim width in a direction perpendicular to an optical axis of a lens of the glasses fitted in the lens frame, the shape of the lens frame can be measured accurately without deformation of the lens frame on a nose or ear contacting side.

For achieving this object, the measurement control means may be constructed such that when it judges that the lens frame is a lens frame for half glasses and that right and left portions of a lower rim of the lens frame are curved largely, while right and left portions of an upper rim of the lens frame are curved to a small extent, it controls to let the contact element move in contact with the lens frame while allowing the contact element to rotate from the lower rim toward the upper rim on the nose contacting side, thereby creating a contact measurement state in which the upper rim does not undergo an abrupt deforming force from the contact element on the ear contacting side.

Further, the measurement control means may be constructed such that the operation of each of the motors is controlled, allowing the contact element to measure both an outer peripheral surface of the lens frame and the lens frame groove, allowing the position of the outer peripheral surface of the lens frame and the position of the lens frame groove to be determined in accordance with measurement signals provided from the contact element moving distance detecting means, a difference between the position of the outer peripheral surface of the lens frame and the position of the lens frame groove is determined as a rim width, and if the rim width thus determined is smaller than a predetermined value and hence the lens frame is apt to be deformed, the operation of the drive motor is controlled to diminish the contact pressure of the contact element against the lens frame which contact is ensured by the spring.

Further, the contact element moving mechanism may comprise a slide base capable of moving forward and backward horizontally, a measuring section moving motor for moving the slide base forward and backward horizontally, a rotary base held by the slide base horizontally rotatably, a base rotating motor for rotating the rotary base, an upper slider mounted to the rotary base so as to be movable forward and backward horizontally and holding the contact element vertically movably, a spring which urges the upper slider in either the forward direction or the backward direction, and a manual measurement force changing means which changes over the upper slider urging force of the spring to change over the contact pressure of the contact element against the lens frame.

BRIEF DESCRIPTION OF THE ATTACHED DRAWINGS

Figure 2A:
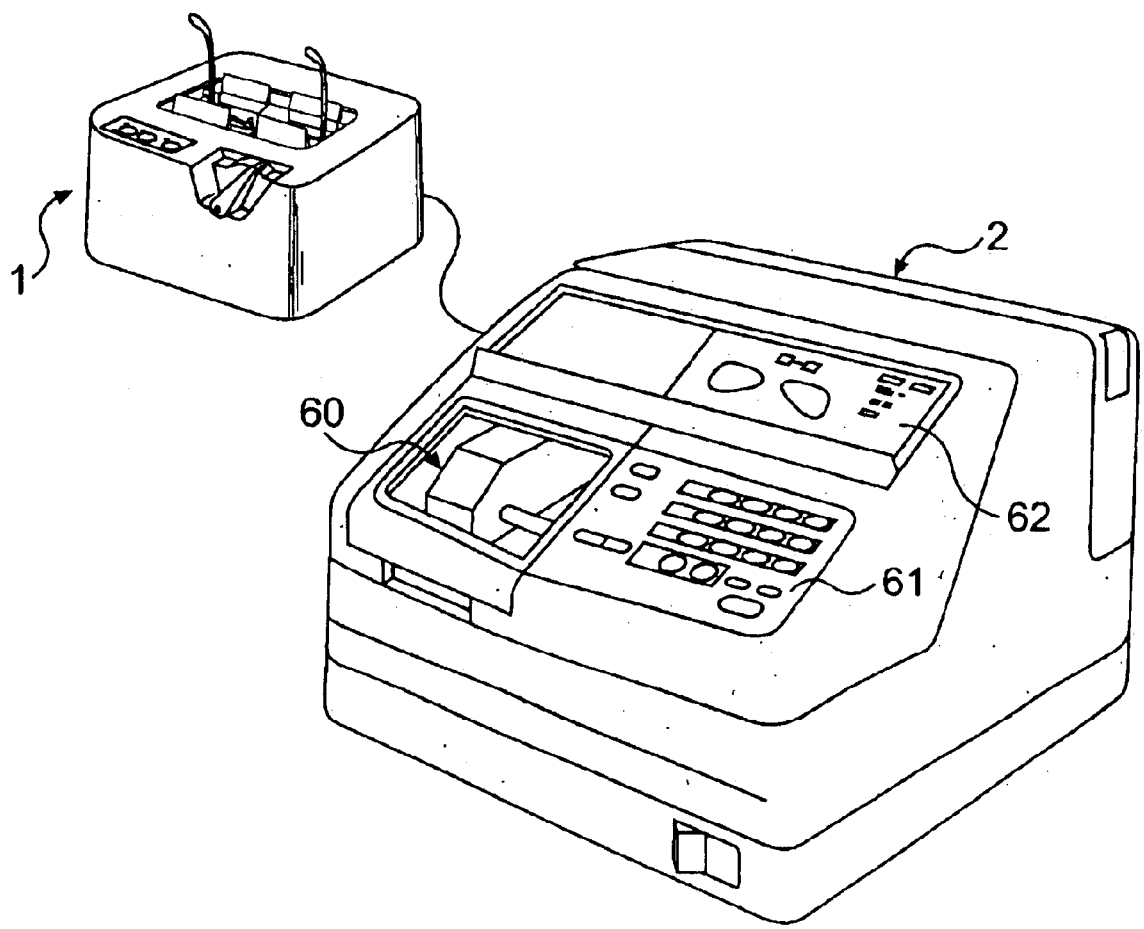
FIG. 2(a) is a schematic perspective view of the glasses lens fitness determining apparatus having the control circuit shown in FIG. 1.
Figure 4:
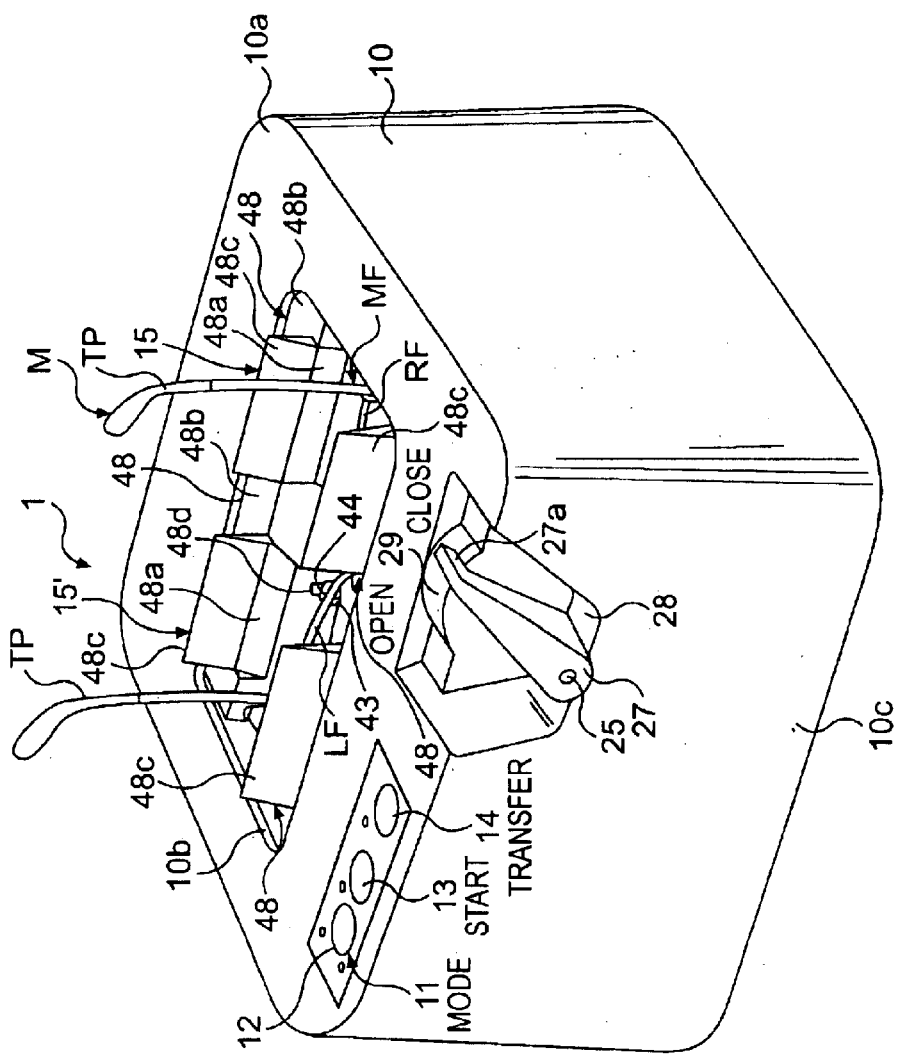
FIG. 4 is an enlarged perspective view of the frame shape measuring apparatus shown in FIG. 2(a)
Figure 5A:
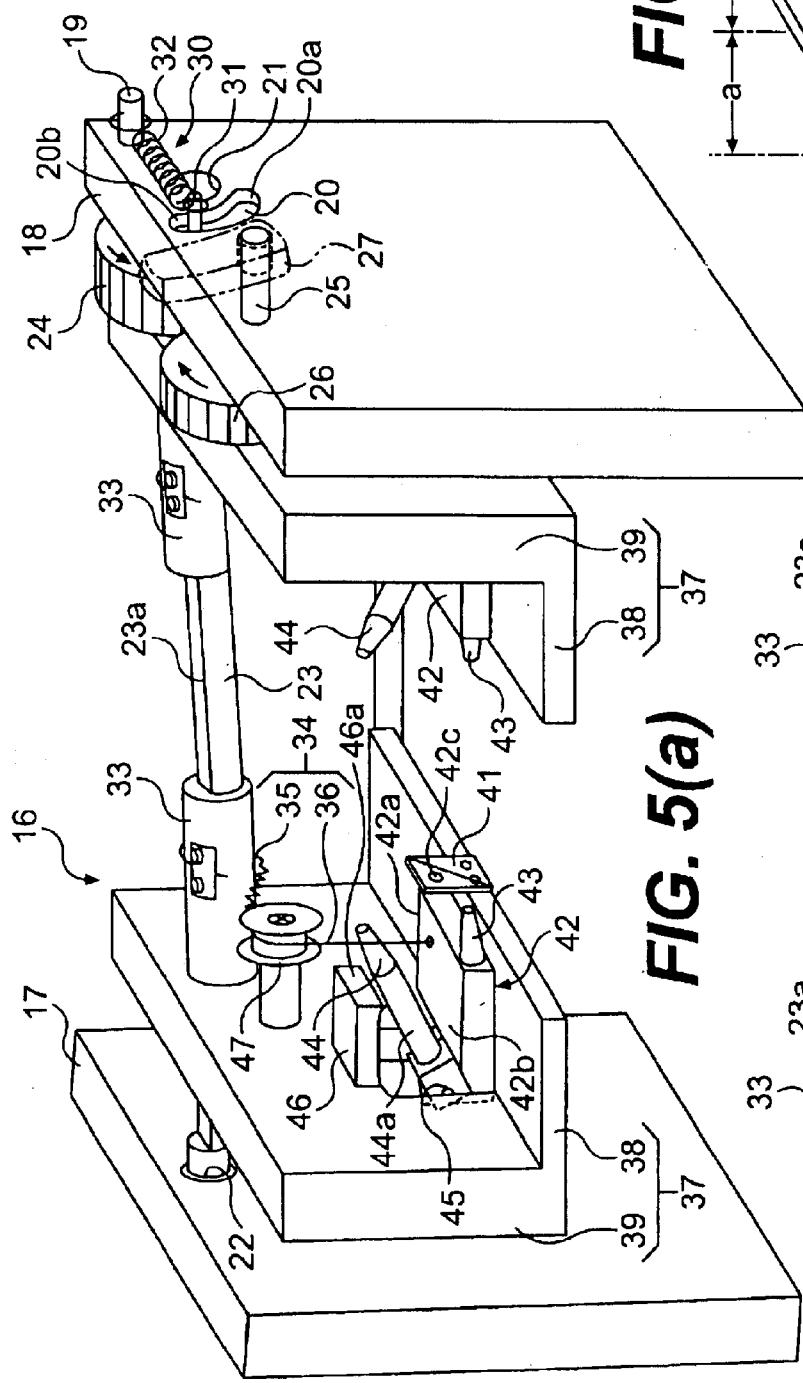
FIG. 5(a) is a perspective view of a principal portion of the frame shape measuring apparatus shown in FIGS. 2(a) and 4, FIGS. 5(b) and 5(c) are sectional diagrams for explaining a relation between a sleeve and an operating shaft both shown in FIG. 5(a)
Figure 5D:
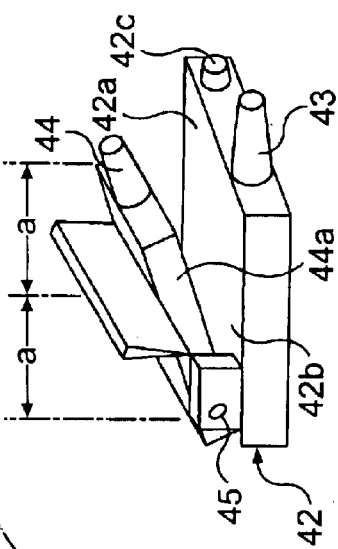
FIG. 5(d) is a diagram explanatory of a holding pawl.
Figure 5C:
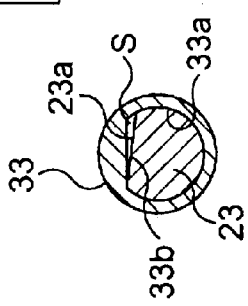
Figure 5B:
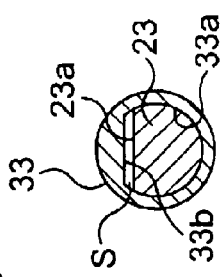
Figure 6A:
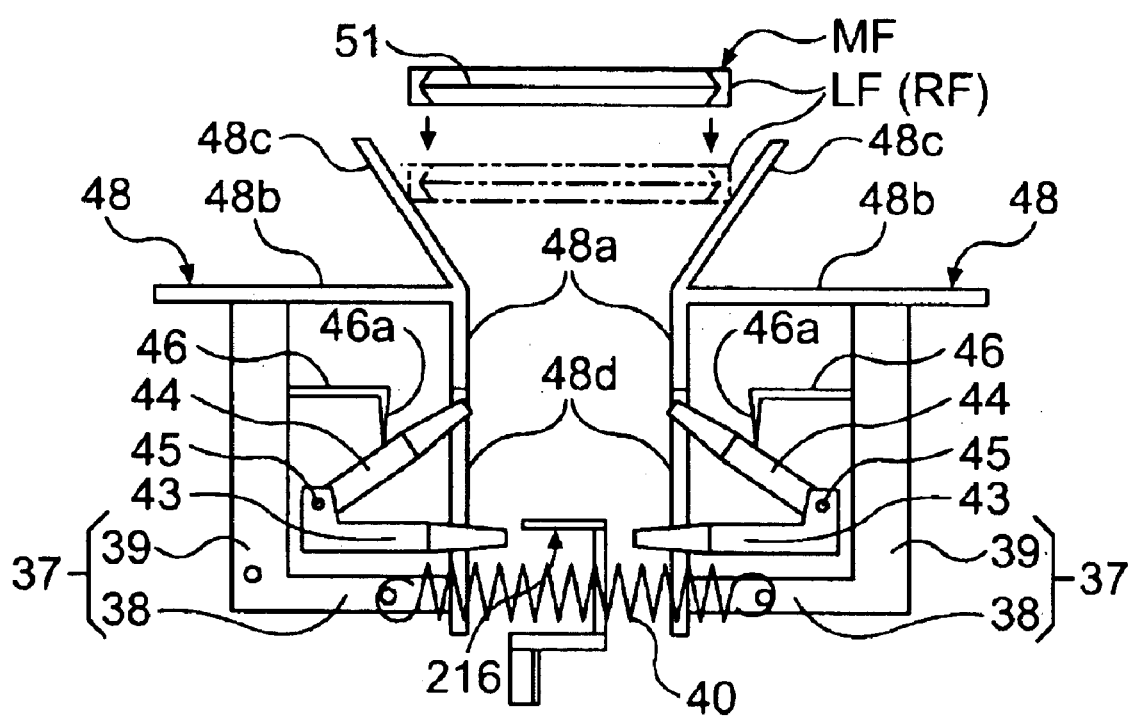
Figure 6B:
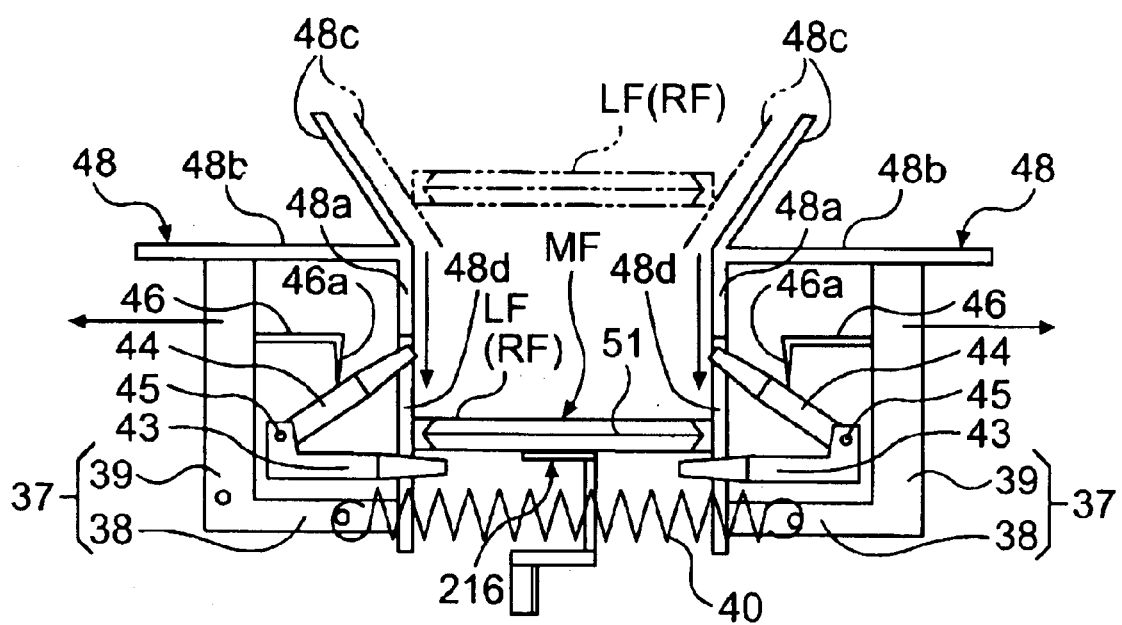
Figure 6C:
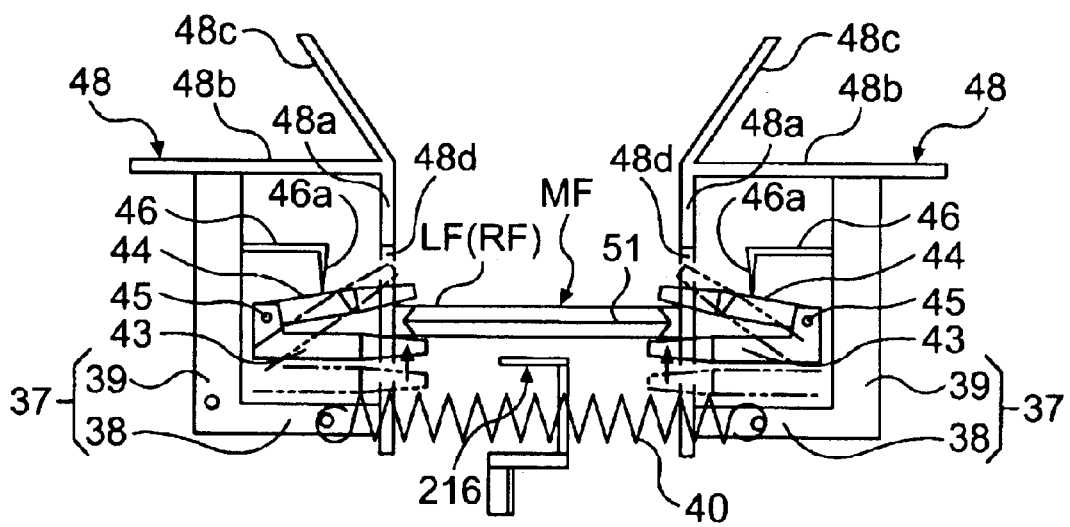
Figure 7A:
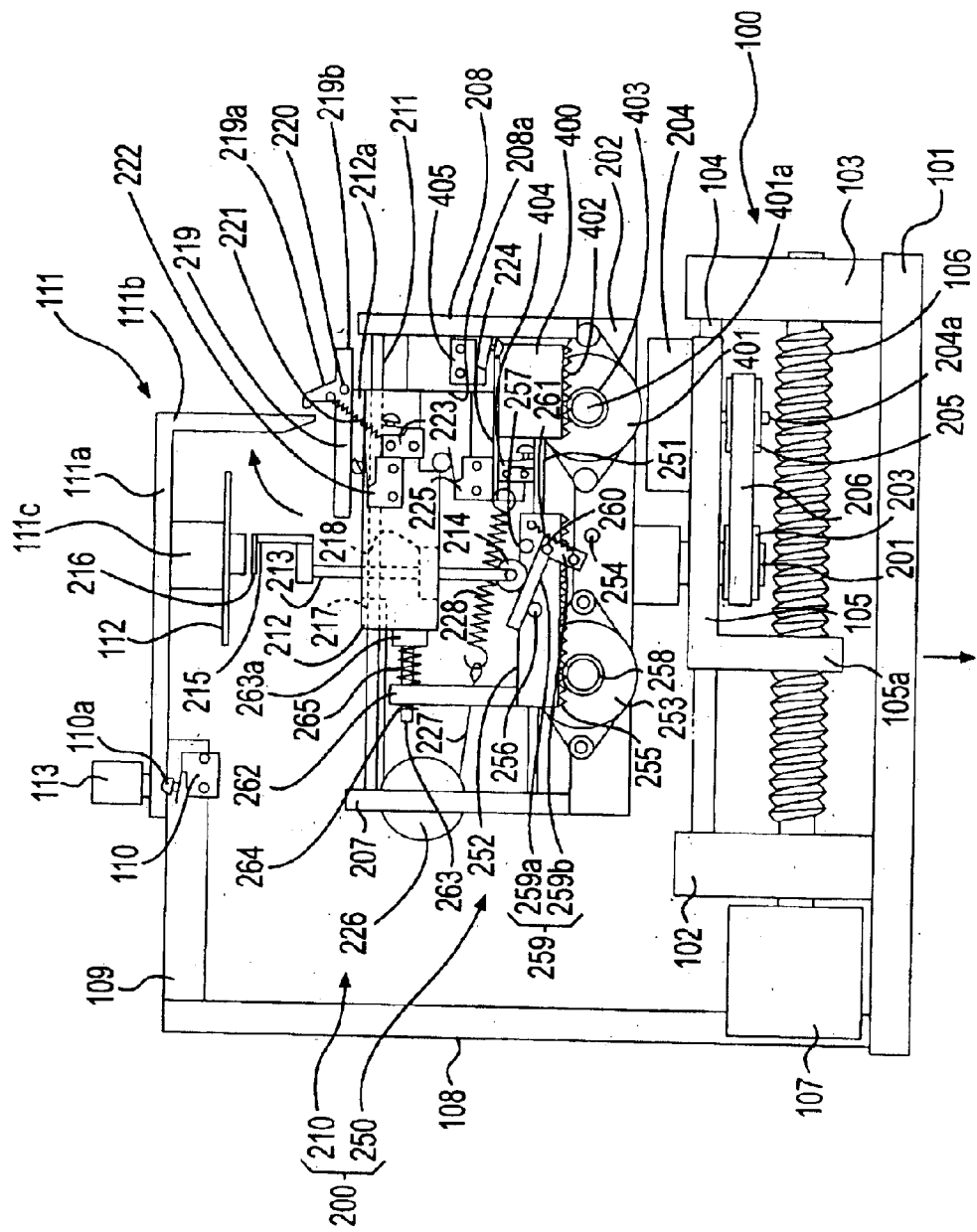
Figure 7B:
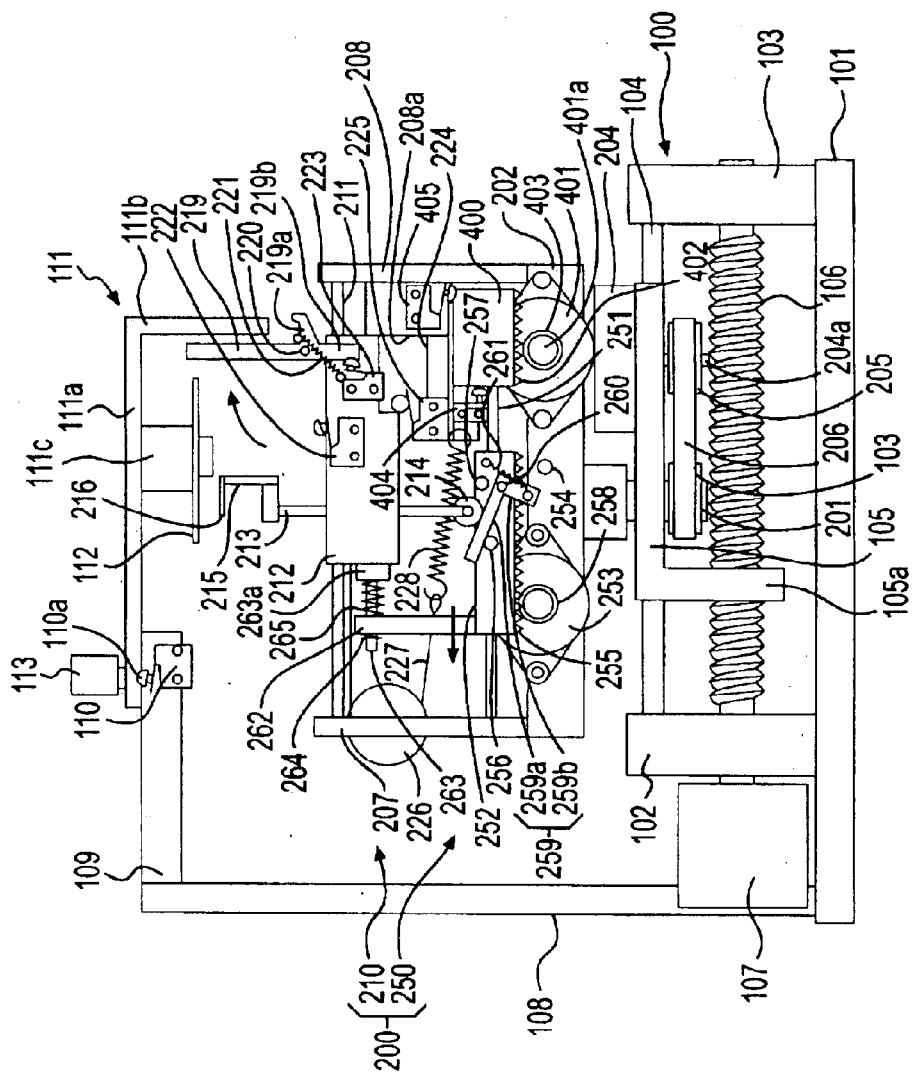
Figure 8A:
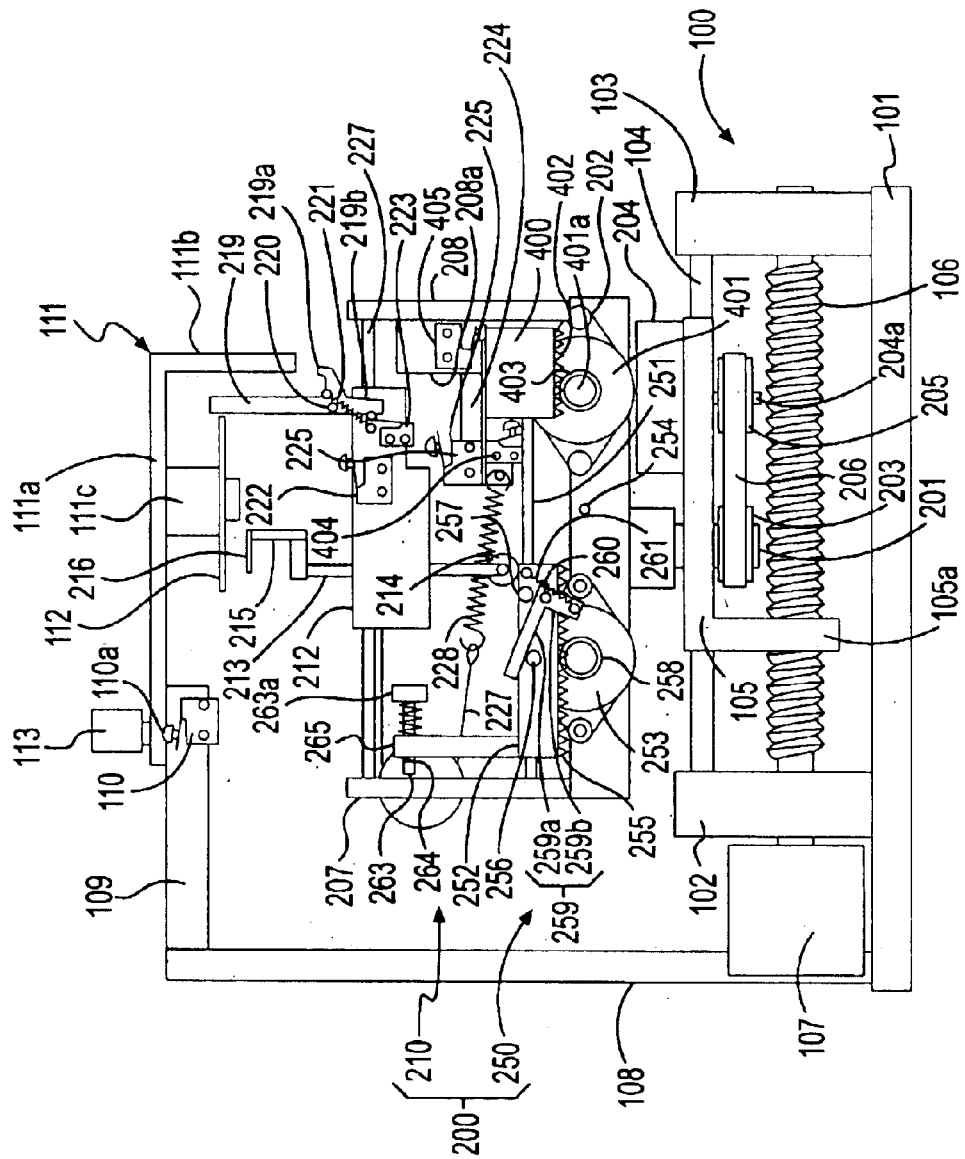
Figure 8B:
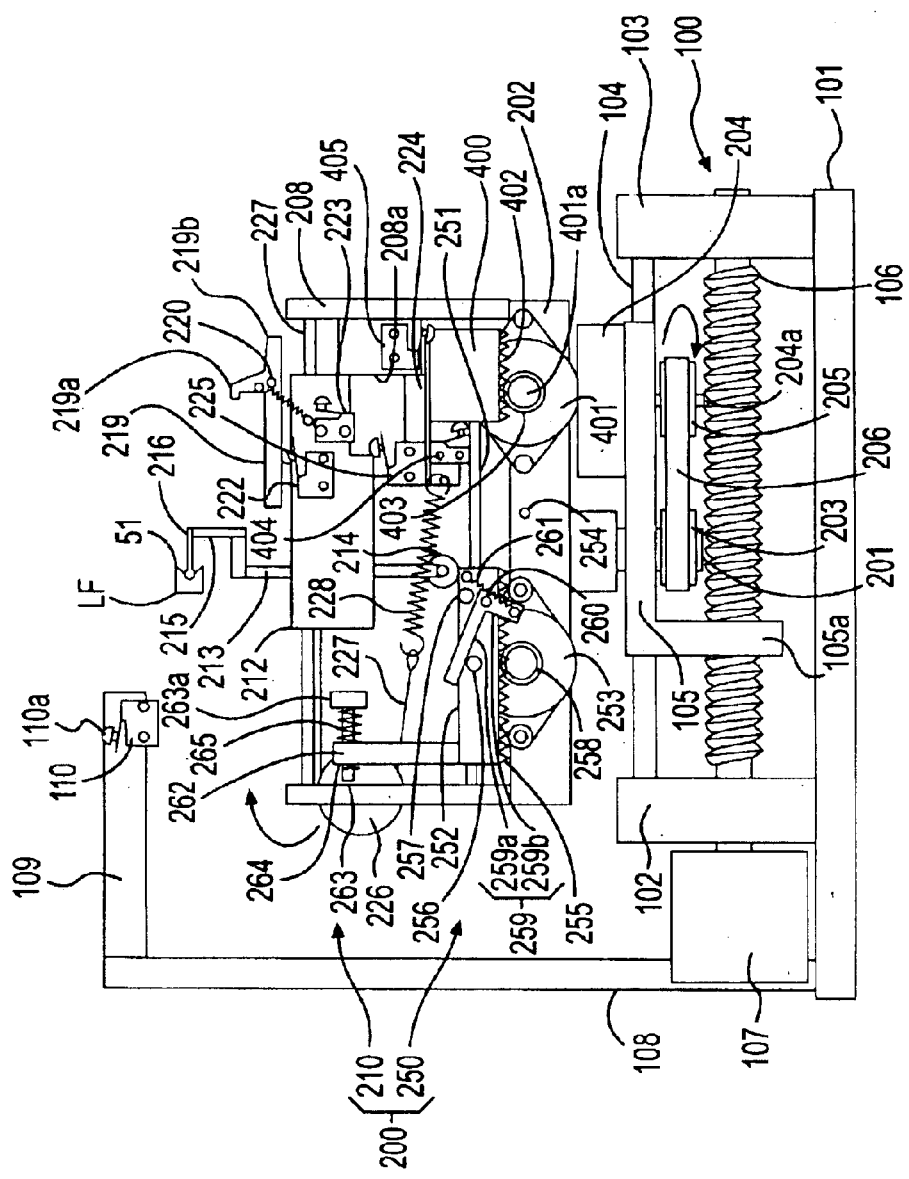
Figure 9:
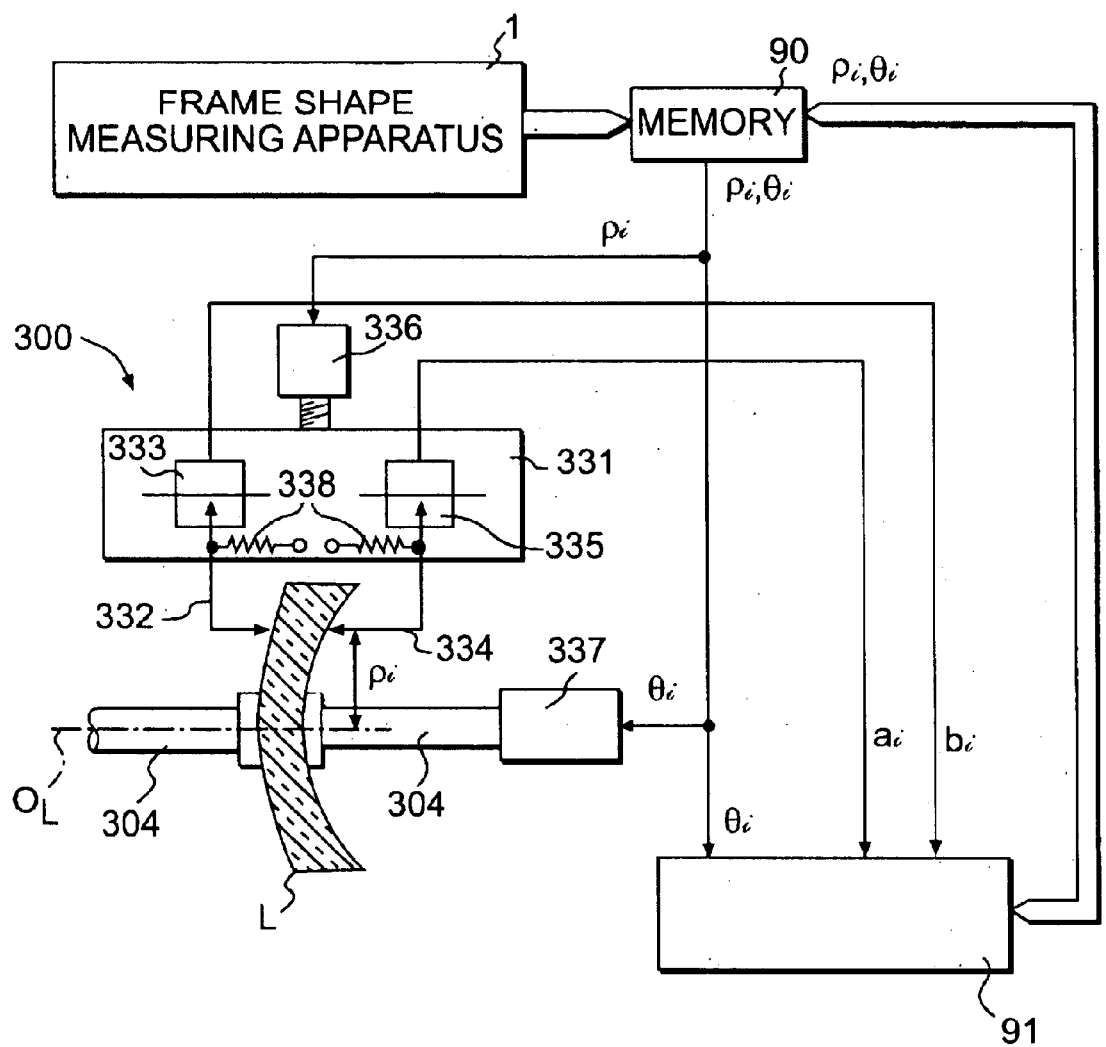
Figure 10A:
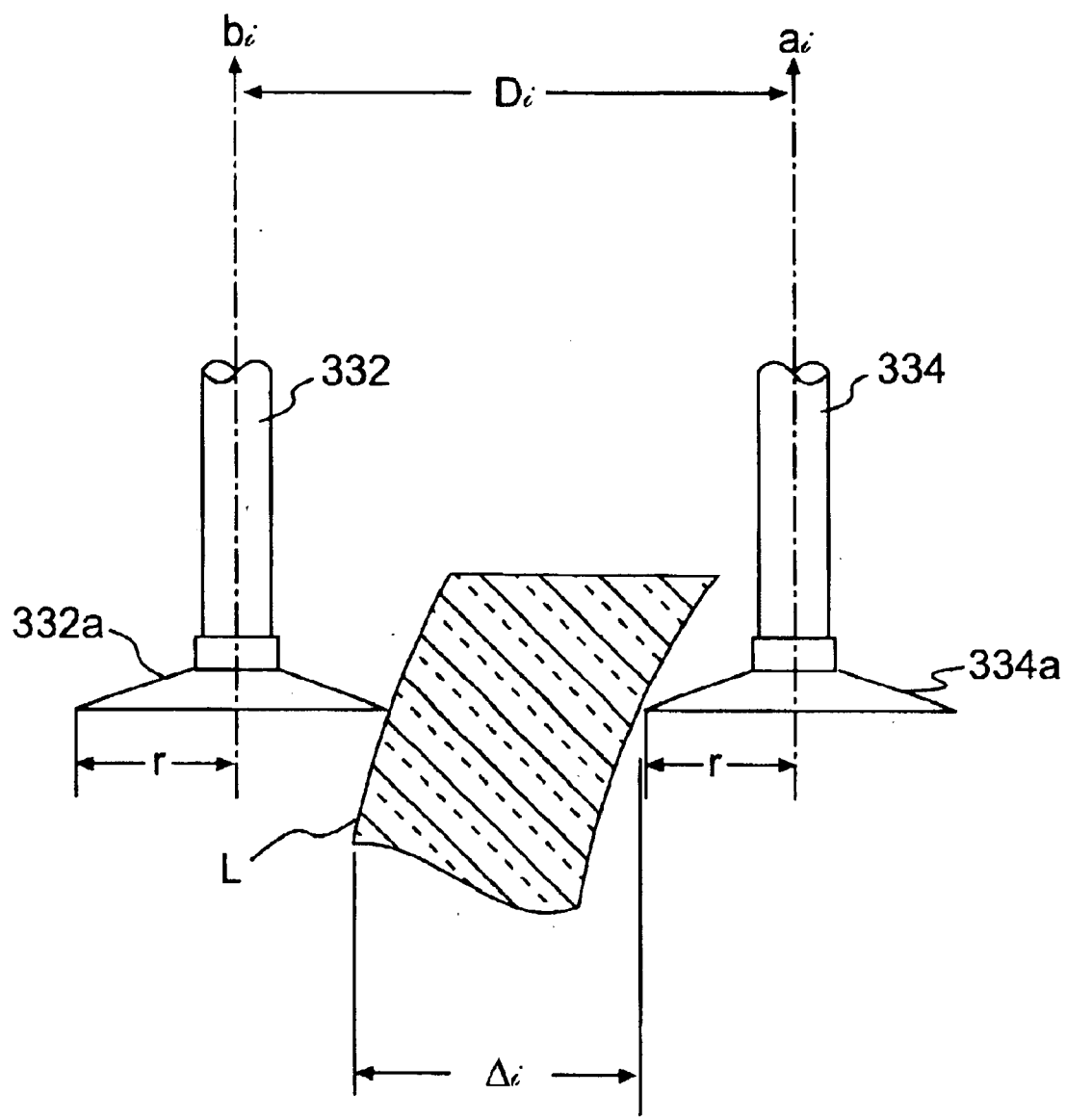
Figure 10B:
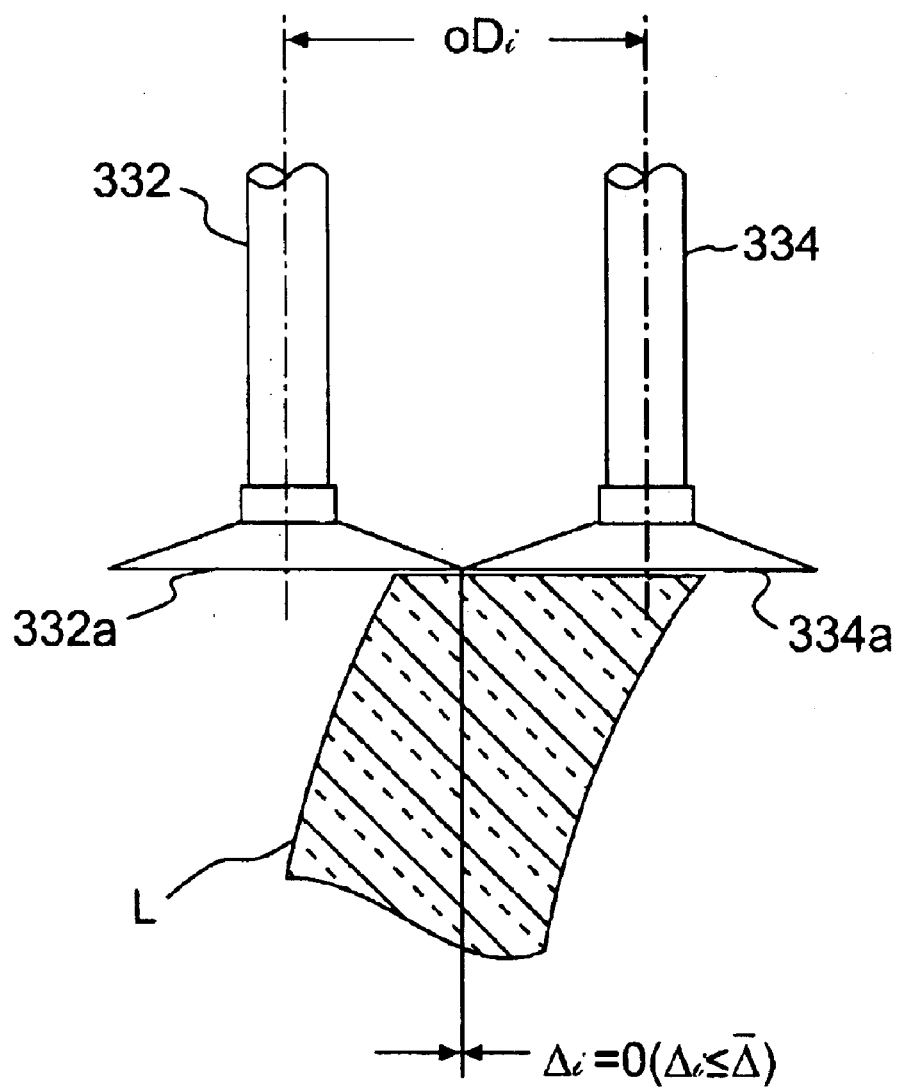
Figure 10C:
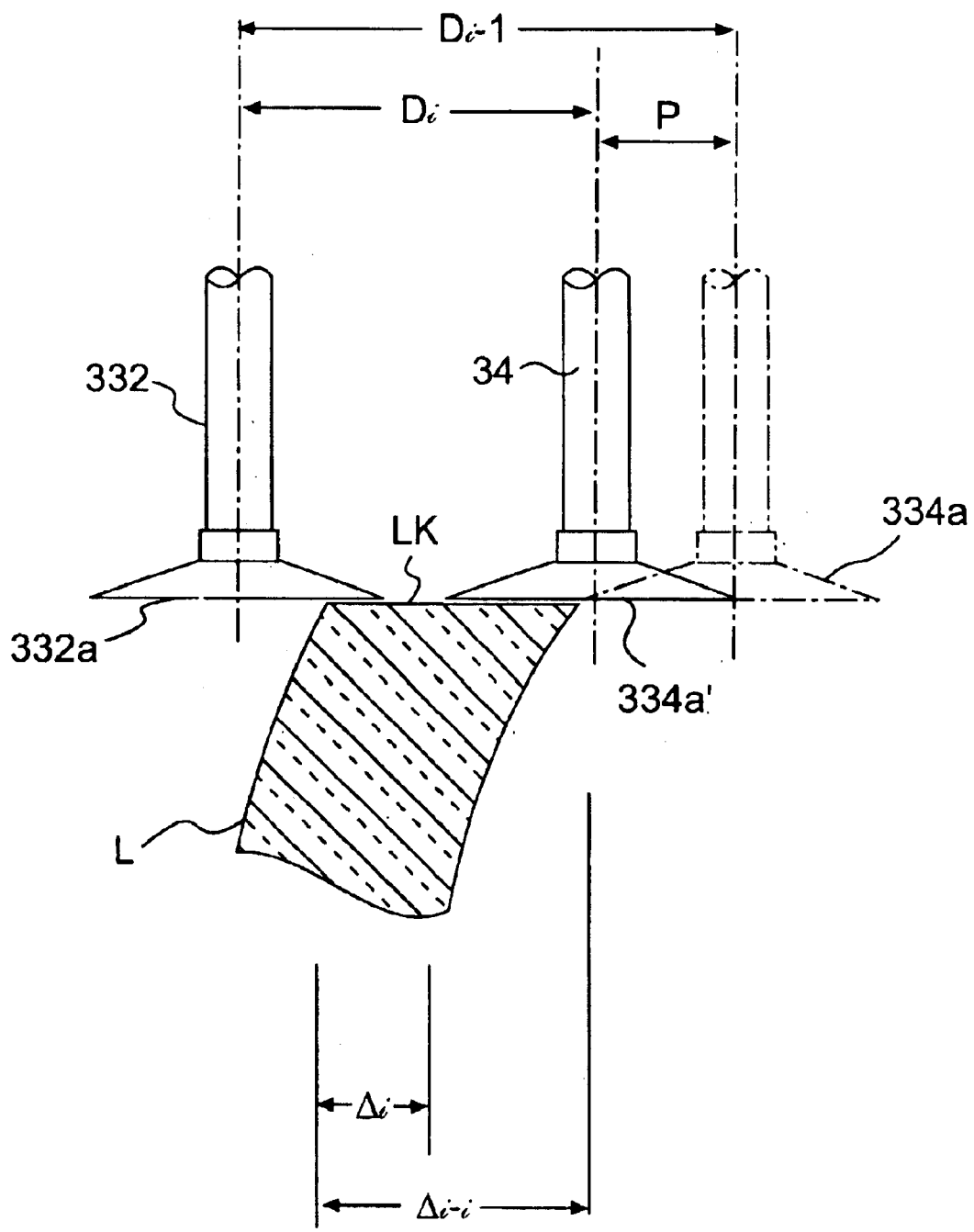
Figure 11A:
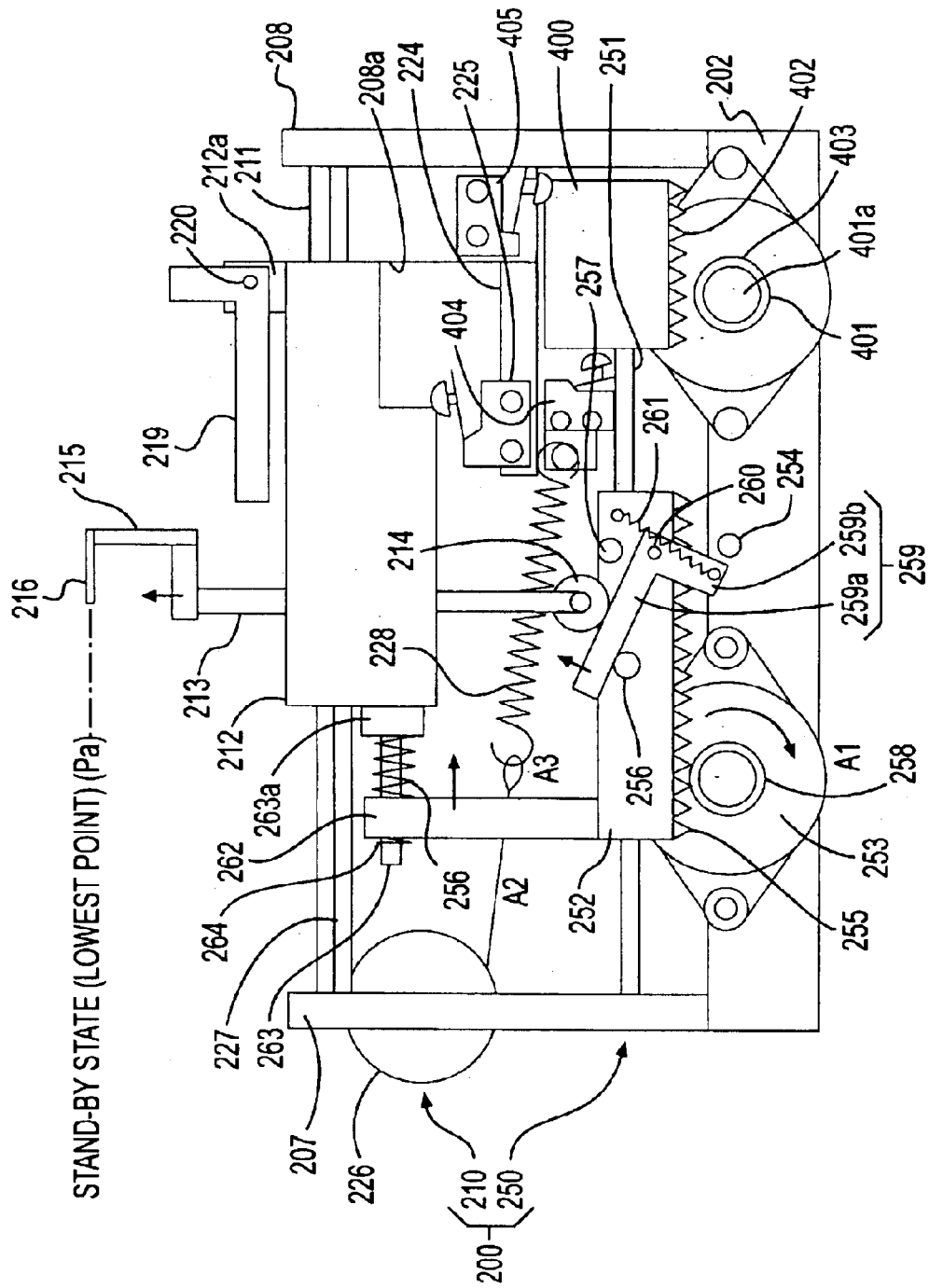
Figure 11B:
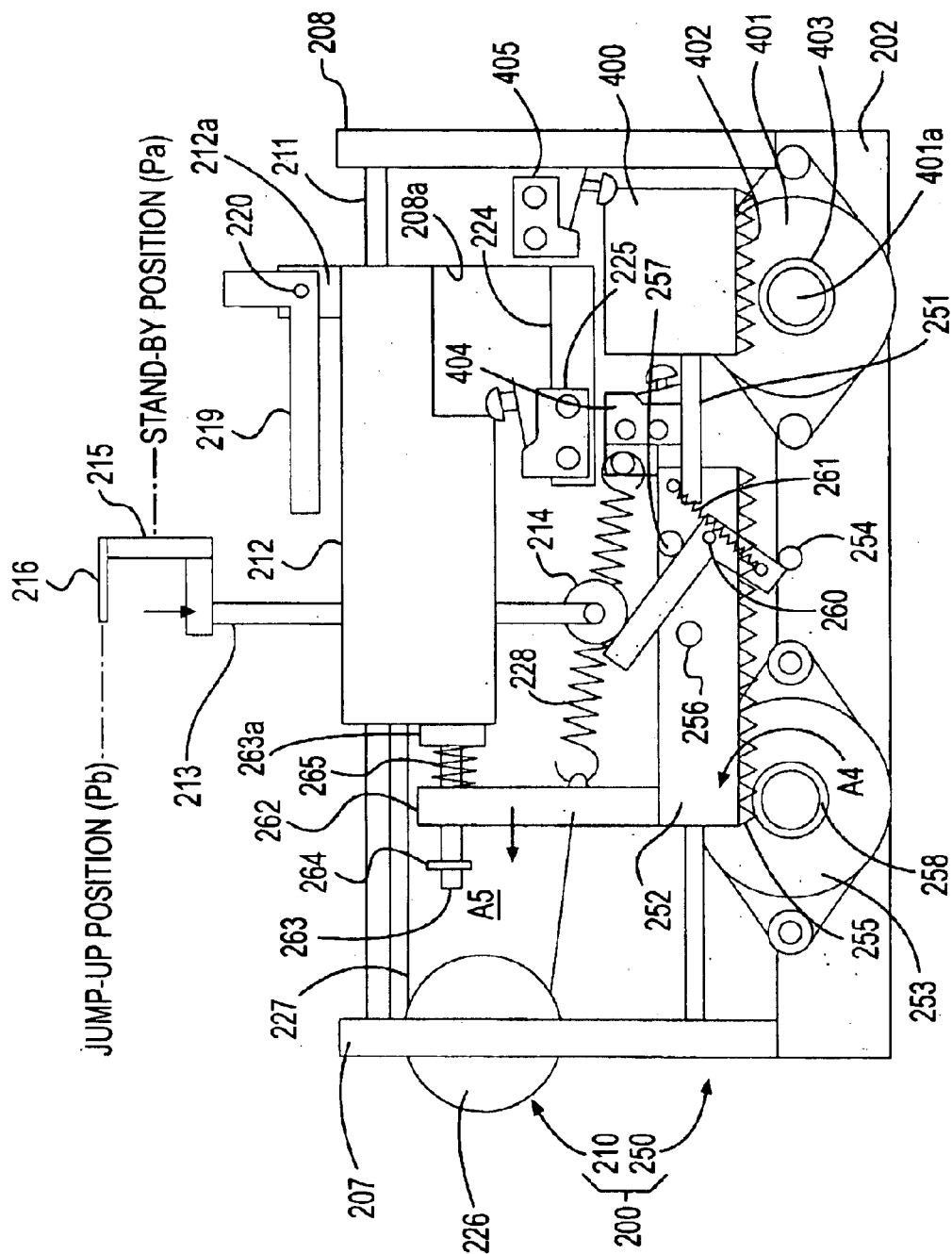
Figure 11C:
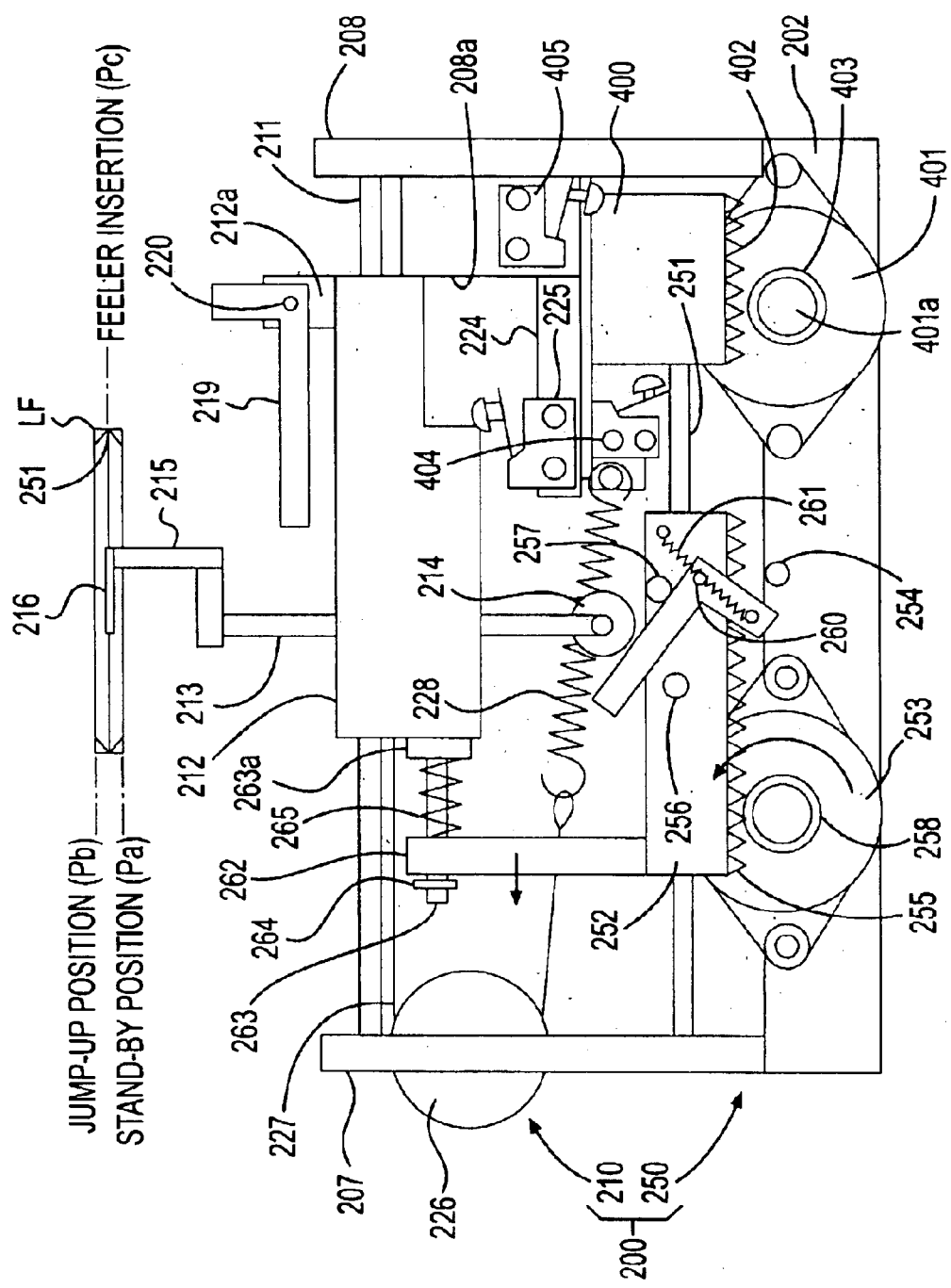
Figure 12A:
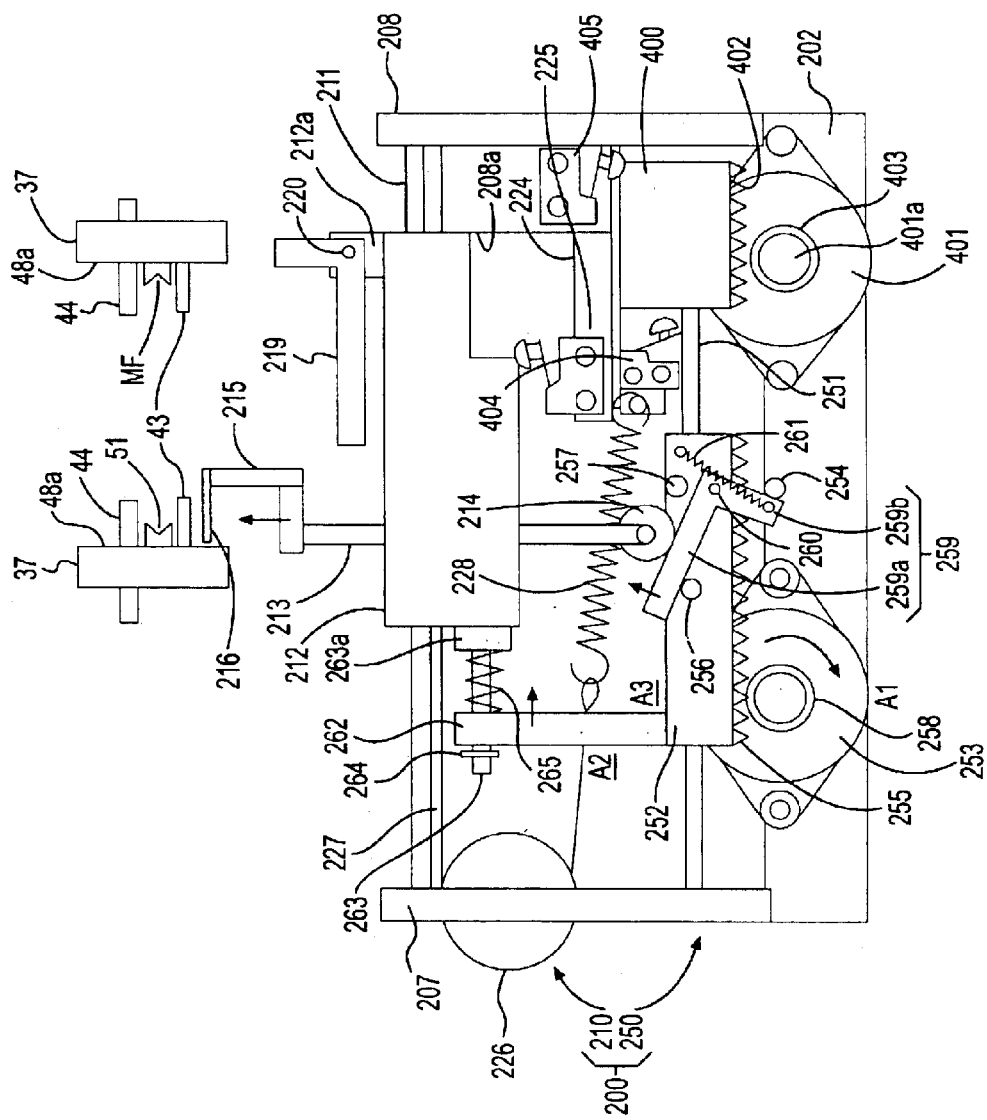
Figure 14:
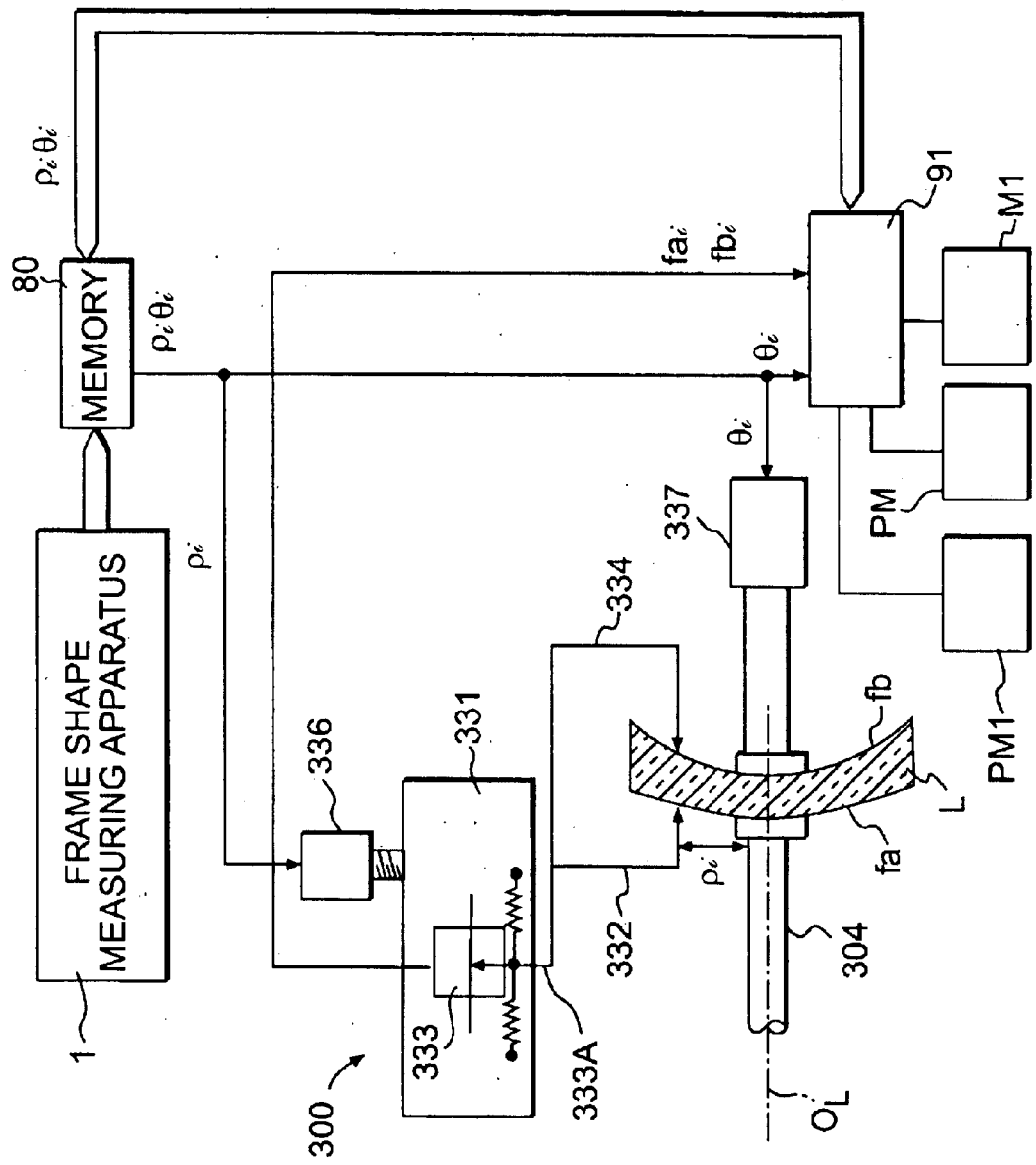
Figure 15:
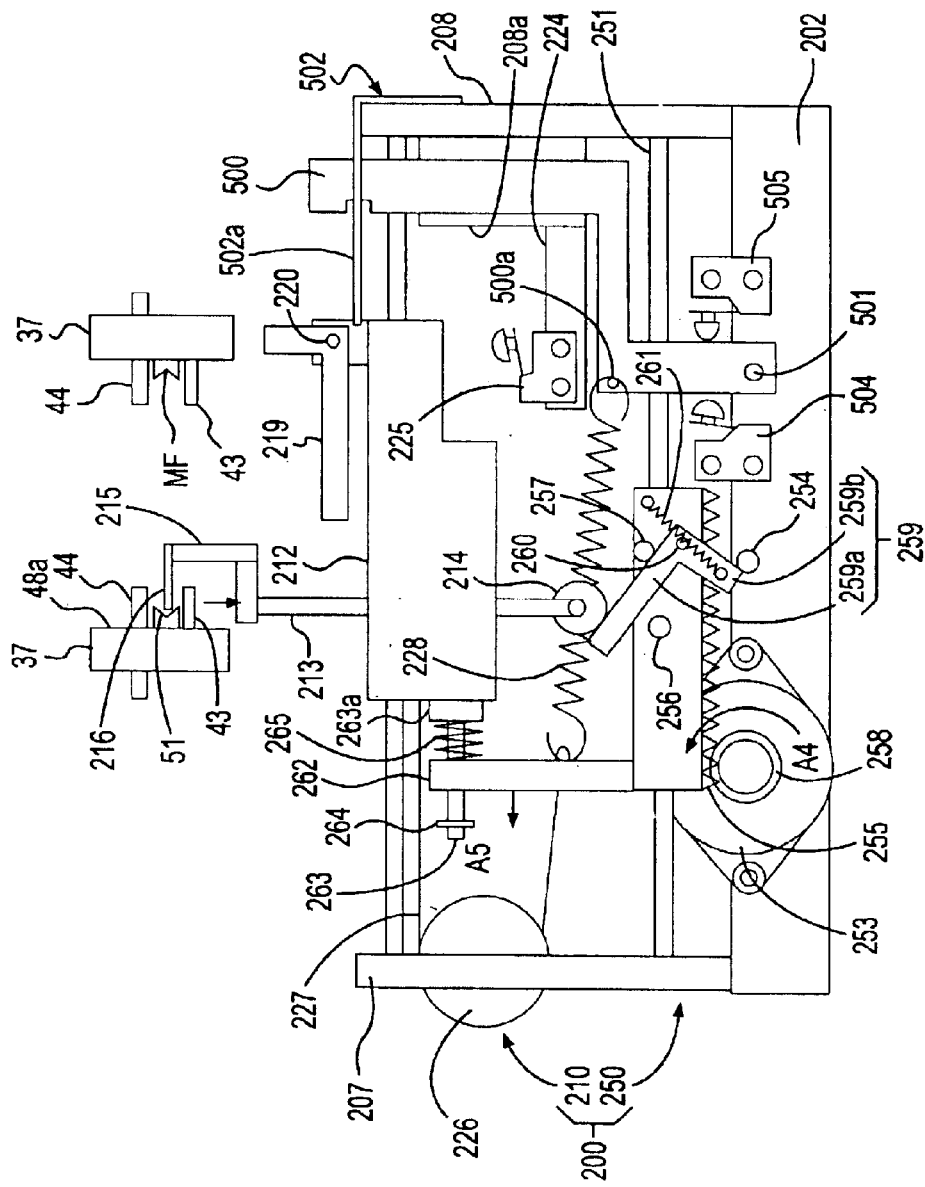
Figure 16:
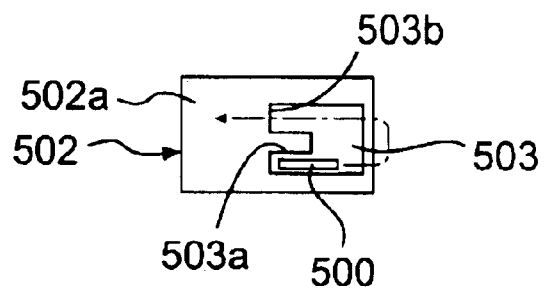
Figure 17:
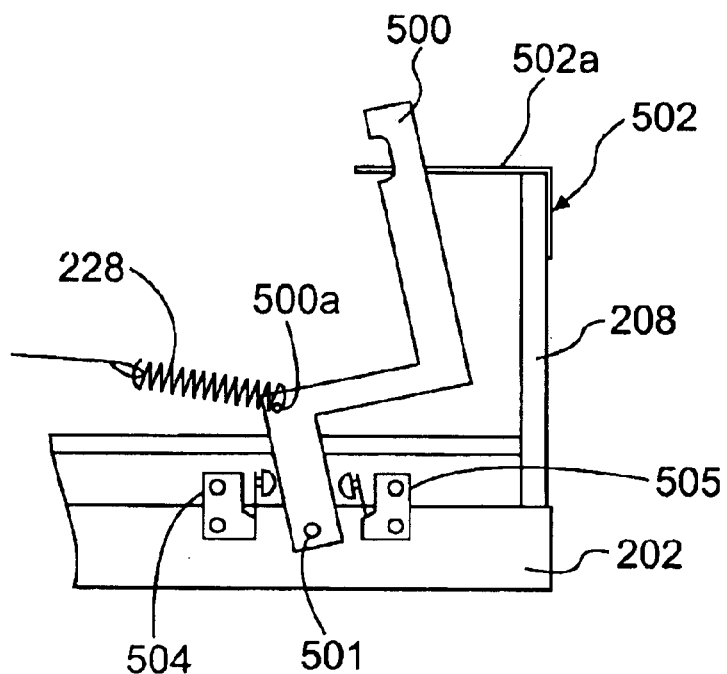

FIGS. 6(a) to 6(c) illustrate glasses frame holding operations of the frame shape measuring apparatus shown in FIGS. 4 and 5;

FIGS. 7(a) and 7(b) illustrate a frame shape measuring section, etc. in the frame shape measuring apparatus;

FIGS. 8(a) and 8(b) illustrate the frame shape measuring section, etc. in the frame shape measuring apparatus;

FIG. 9 illustrates a lens thickness measuring section of a lens edge grinder shown in FIG. 2(a);

FIGS. 10(a) to 10(c) illustrate the operation of fillers shown in FIG. 9;

FIGS. 11(a) to 11(c) illustrate the operation of the measuring section in the frame shape measuring apparatus;

FIG. 12 illustrates another configuration of a lens thickness measuring section in the lens edge grinder shown in FIG. 9;

FIG. 13 is an explanatory diagram for rim thickness measurement;

FIG. 14 is an explanatory diagram for the measurement of a half glasses lens;

FIG. 15 is an explanatory diagram of a principal portion, illustrating a further embodiment of the present invention;

FIG. 16 is an explanatory diagram of a plate for changing a measurement pressure shown in FIG. 15;

FIG. 17 is a diagram explanatory of operation in FIG. 15; and

Figure 18:
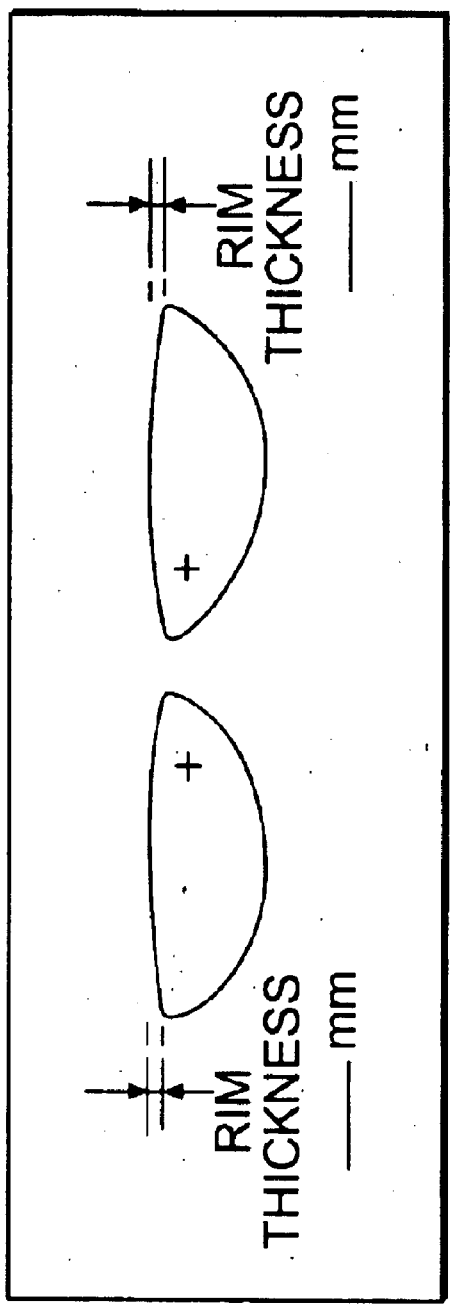

FIG. 18 is an explanatory diagram showing an example of display of a measurement result obtained in the embodiment illustrated in FIG. 15.

DESCRIPTION OF THE PREFERRED EMBODIMENTS

First Embodiment

A lens frame shape measuring apparatus according to an embodiment of the present invention will be described below with reference to the drawings.

In FIG. 2(a), the numeral 1 denotes a frame shape measuring apparatus and numeral 2 denotes a lens edge grinder (a lens edge machining apparatus) for grinding a to-be-machined lens into a glasses lens shape in accordance with glasses shape data provided from the frame shape measuring apparatus 1.

(1) Frame Shape Measuring Apparatus 1

As shown in FIG. 4, the frame shape measuring apparatus (lens frame shape data input means) 1 comprises a measuring apparatus body 10 having an opening 10b centrally of an upper surface 10a thereof and a switch section 11 provided on the upper surface 10a of the measuring apparatus body 10. The switch section 11 includes a mode change-over switch 12 for switching between right and left measurement modes, a start switch 13 for the start of measurement, and a data transfer switch 14.

The frame shape measuring apparatus 1 has glasses frame holding mechanisms (holding means) 15 and 15' for holding left and right lens frames LF, RF of a glasses frame MF of glasses M such as that shown in FIG. 4 and an operating mechanism 16 (FIG. 5(a)) for operating the holding mechanisms 15, 15'. The frame shape measuring apparatus 1 is further provided with a measuring section moving mechanism 100 and a frame shape measuring section (frame shape measuring means) 200 supported by the measuring section moving mechanism 100, as shown in FIG. 7. The measuring section moving mechanism 100 and the frame shape measuring section 200 constitute a measuring element moving mechanism (a contact element moving mechanism).

The measuring section moving mechanism 100 is for moving the frame shape measuring section 200 between the glasses frame holding mechanisms 15 and 15'. The frame shape measuring section 200 is for measuring the shape of the lens frame LF (RF) of the glasses frame MF. The glasses frame holding mechanisms 15, 15', operating mechanism 16, measuring section moving mechanism 100, and frame shape measuring section 200 are installed within the measuring apparatus body 10.

In FIG. 7, the numeral 101 denotes a chassis disposed in a lower portion of the measuring apparatus body 10. In FIG. 5, the numerals 17 and 18 denote support frames disposed in parallel with each other and fixed to the chassis 101 in a portion not shown, numeral 19 denotes a retaining pin projected from an outer surface (the side opposite to the support frame 17) of the support frame 18, numeral 20 denotes an arcuate slit formed in an upper end portion of the support frame 18, and numerals 21 and 22 denote mounting holes formed in the support frames 17 and 18. The mounting hole 21 is positioned between the arcuate slit 20 and the retaining pin 19, and the arcuate slit 20 is concentric with the mounting hole 21.

Operating Mechanism 16

As shown in FIGS. 4 and 5, the operating mechanism 16 is provided with an operating shaft 23 held rotatably in the mounting holes 21 and 22 of the support frames 17 and 18, a driven gear 24 fixed to one end (the end located on the support frame 18 side) of the operating shaft 23, a rotary shaft 25 extending through the support frame 18 and further through a front side 10c of the measuring apparatus body 10, a driving gear 26 fixed to or integral with one end of the rotary shaft 25 and engaged with the driven gear 24, and an operating lever 27 secured to an opposite end of the rotary shaft 25. In FIG. 5, the numeral 23a denotes a flat portion of the operating shaft 23, the flat portion 23a extending up to near both ends of the operating shaft 23.

As shown in FIG. 4, a recess 28 is formed in the measuring apparatus body 10 so as to span both upper surface 10a and front side 10c, and an arcuate protuberance 29 is formed on an upper surface of the recess 28. On the upper surface 10a of the measuring apparatus body 10 are put indications "OPEN" and "CLOSE" on left and right sides, respectively, of the protuberance 29. The operating lever 27 referred to above is disposed on a front side of the recess 28 and a bent portion, i.e., a pointer portion 27a, formed at an upper end of the operating lever 27 is adapted to move on the protuberance 29 to indicate whether the present state is open or closed.

Between the driven gear 24 and the retaining pin 19 is disposed a two-position holding mechanism (two-position holding means) 30 which is for holding the frame (corresponding to the above "CLOSE") and releasing the frame (corresponding to the above "OPEN").

The two-position holding mechanism 30 has the arcuate slit 20 referred to above, a movable pin 81 projected from a side face of the driven gear 24 and extending through the arcuate slit 20, and a spring (extension spring) 32 mounted between the movable pin 31 and the retaining pin 19. Since the arcuate slit 20 is concentric with the mounting hole 22 as noted earlier, it is also concentric with the driven gear 24 and the operating shaft 23. Consequently, with the tensile force of the spring 32, the movable pin 81 is held at one of both ends 20a and 20b of the arcuate slit 20.

Further, the operating mechanism 16 is provided with a pair of sleeves 33 movably in the longitudinal direction of the operating shaft 23, and within each sleeve 33 is formed an insertion hole 33a in the form of a partially cutout circle, the insertion hole 33a having a flat portion 33b. A slight gap S is formed between the flat portion 23a of the operating shaft 23 and the flat portion 33b of the insertion hole 33a, as shown in FIGS. 5(b) and 5(c), and the sleeves 33 are held so as to be relatively rotatable slightly in the circumferential direction of the operating shaft. Strings 34 (one is omitted in FIG. 5(a)) are attached to the sleeves 33, respectively, the strings 34 each having an elastic portion which can expand and contract with their own elastic force. The strings 34 are each provided with a spring (elastic portion) 35 fixed at one end to the associated sleeve 33 and a wire 36 contiguous to an opposite end of the spring 36.

Frame Holding Mechanisms 15 and 15'

Since the frame holding mechanisms 15 and 15' are of the same structure, a description will be given below of only the frame holding mechanism 15.

As shown in FIGS. 4 and 5, the frame holding mechanism 15 has a pair of movable frames 37 which are held within the measuring apparatus body 10 so as to be movable horizontally toward and away from each other. Each movable frame 37 is formed in L shape by a horizontal plate portion 38 and a vertical plate portion 39 contiguous to one end of the horizontal plate portion 88 upward. The sleeves 33 are each held by the vertical plate portion 39 rotatably and axially immovably.

As shown in FIGS. 5 and 6, the frame holding mechanism 15 is further provided with an extension spring 40 installed between the horizontal plate portions 38 of the movable frames 37, a support plate 41 fixed centrally to a front edge of the associated horizontal plate portion 38, and a pawl mounting plate 42 disposed between an upwardly projecting portion of the support plate 41 from the horizontal plate portion 38 and the vertical plate portion 39. The pawl mounting plate 42 is held by both support plate 41 and vertical plate portion 39 so as to be pivotable about a shaft-like support lug 42c formed on one side 42a of the pawl mounting plate 42. Also on a rear side the pawl mounting plate 42 is formed a shaft-like support lug, which is not shown.

A tapered, shaft-like holding pawl 43 is projected on a front end of an opposite side 42b of the pawl mounting portion 42, and a rear end of a shaft-like holding pawl 44 is held at a rear end of the opposite side of the pawl mounting plate 42 so as to be pivotable through a support shaft 45. As shown in FIG. 5(d), a base portion 44a of the holding pawl 44 is formed in the shape of a rectangular plate and a front end of the holding pawl 44 is formed in a tapered shape. The holding pawl 44 is adapted to pivot about the support shaft 45 toward and away from the holding pawl 43. The front end of the holding pawl 44 and the pawl mounting plate 42 are urged in an opening direction constantly by means of a torsion spring (not shown) which is wound round the support shaft 45.

Further, an L-shaped engaging pawl 46 is projected from the vertical plate portion 39 so as to be positioned above the holding pawl 44. An edge-like pawl portion 46a extends downward from a front end of the engaging pawl 46 and is engaged with the holding pawl 44. With this arrangement, when the opposite side 42b of the pawl mounting plate 42 is turned upward around one side 42a, the spacing between the holding pawls 43 and 44 is narrowed against the resilience of the torsion spring (not shown). As shown in FIGS. 6(a) to 6(c), the edge-like pawl portion 46a of the engaging pawl 46 engages a nearly central part of the holding pawl 44. Between the engaging pawl 46 and the sleeve 33 is disposed an idle pulley 47 which is held rotatably on the vertical plate portion 39. The wire 36 referred to above is entrained on the idle pulley 47 and an end portion of the wire 36 is fixed to the pawl mounting plate 42 so as to be positioned between both sides 42a and 42b of the pawl mounting plate.

Opposed sides of the movable frames 37 are covered with frame guide members 48 shown in FIGS. 4 and 6. The frame guide members 48 are each provided with a vertical plate portion 48a fixed to the front end of the associated horizontal plate portion 38, a horizontal plate portion 48b fixed to an upper end of the associated vertical plate portion 39, and an inclined guide plate portion 48c contiguous to a corner at which the plate portions 48a and 48b are contiguous to each other, the inclined guide plate portion 48c being inclined to the horizontal plate portion 48b side. In the vertical plate portion 48a is formed an opening 48d correspondingly to the holding pawls 43 and 44, the holding pawl 44 being projected from the opening 48d. When the holding pawls 44 and 43 are open at maximum as in FIGS. 6(a) and 6(b), a front end portion of the holding pawl 43 is positioned within the opening 48d.

In such a configuration, the inclined guide plate portions 48c of the frame guide members 48 are inclined in directions in which both are spaced to a greater extent from each other toward the respective upper ends. Therefore, when the glasses frame MF is placed between the inclined guide plate portions 48c as in FIG. 6(a) and is pushed down from above against the resilience of the extension spring 40, the spacing between both flame guide members 48 is expanded under a guiding action of the inclined guide plate portions 48c, whereby the glasses flame MF, hence the lens frame LF (RF) thereof, is moved onto the holding pawls 43 and is held by the holding pawls.

In this state, if the operating lever 27 is turned from "OPEN" position to "CLOSE" position, this turning motion is transmitted to each sleeve 88 through the rotary shaft 25, gears 26, 24 and operating shaft 23 and, in association with each sleeve 33, a part of the spring 35 is wound round the sleeve 33, so that the pawl mounting plate 42 is turned upward around one side 42a through the wire 36 contiguous to the spring 35 and the spacing between the holding pawls 43 and 44 is narrowed as in FIG. 6(c), whereby the glasses frame MF, hence the lens frame LF (RF) thereof, is held between the holding pawls 43 and 44 as in FIG. 6(c). At this position, the movable pin 31 is held at the lower end 20a of the arcuate slit 20 by virtue of the spring 32.

For removing the glasses lens MF, hence the lens frame LF (RF), from between the holding pawls 43 and 44, the operating lever 27 is operated in a manner reverse to the above, whereby the associated components operate reverse to the above.

Measuring Section Moving Mechanism 100

As shown in FIGS. 7(a) and 7(b), the measuring portion moving mechanism 100 is constructed so as to have support plates 102 and 103 which are fixed onto the chassis 101 spacedly in the installed direction of the frame holding mechanisms 15 and 15' and also have a guide rail 104 which is laid between upper portions of the support plates 102 and 103 horizontally toward the right and left sides in FIGS. 7(a) and 7(b). Two such guide rails 104 are provided although the other is not shown. The two guide rails 104 are arranged in parallel spacedly in a direction perpendicular to the paper surface. FIGS. 7(a), 7(b), 8(a), and 8(b) illustrate the measuring portion moving mechanism schematically.

The measuring portion moving mechanism 100 is further provided with a slide base 105 held by the guide rails 104 (one is not shown) so as to be movable forward and backward in the extending direction of the guide rails, a feed screw 106 held rotatably by the support plates 102 and 103 at positions below the guide rails 104 (one is not shown), and a measuring portion moving motor 107 which rotates the feed screw 106.

The feed screw 106 is disposed in parallel with the guide rails 104 and the measuring portion moving motor 107 is fixed to the chassis 101. Besides, a vertical plate portion 105a which extends downward is integral with the slide base 105. The feed screw 106 is threadedly engaged with an internally threaded portion (not shown) of the vertical plate portion 105a. According to this configuration, the slide base 105 is moved in the right and left direction, i.e., in the transverse direction, in FIG. 7 by rotating the feed screw 106.

In FIG. 7, the numeral 108 denotes a support plate fixed onto the left end of the chassis 101 and extending vertically, numeral 109 denotes a holder supporting piece fixed at the left end thereof to an upper end of the support plate 108, and numeral 110 denotes a microswitch (sensor) attached to a side face of a front end portion of the holder supporting piece 109. The microswitch 110 is used for detecting a globe mold holder 111 which holds a globe mold such as a template formed in the shape of a glasses frame (globe shape) or a demonstration lens. The microswitch 110 is attached to the support frame 17 or 18 shown in FIG. 5 and the globe mold holder 111 may be detected by contact therewith of the movable frames 37 when the holding pawls 43 and 44 hold the globe mold holder, As shown in FIG. 7, the globe mold holder 111 is formed in L shape in section by a globe mold holding plate portion 111a and a globe mold feeler raising plate portion 111b contiguous downward to one end portion of the globe mold holding plate portion 111a. A globe mold holding boss portion 111c is integral with the globe mold holing plate portion 111a and a globe mold 112 is held by the globe mold holding boss portion 111c.

In FIG. 7, the numeral 113 denotes a fixing screw which is held at an opposite end of the globe mold holding plate portion 111a. When the globe mold holding plate portion 111a is fixed onto the front end portion of the holder supporting piece 109, the globe mold holding plate portion 111a strikes against a sensor lever 110a of the microswitch 110 to detect that the globe mold 112 can be measured.

Frame Shape Measuring Section 200

The frame shape measuring section 200 shown in FIG. 7 comprises a rotary shaft 201 extending vertically through the slide base 105 and held rotatably by the slide base 105, a rotary base 202 mounted to an upper end portion of the rotary shaft 201, a timing gear 203 fixed to a lower end portion of the rotary shaft 201, a base rotating motor 204 adjacent to the rotary shaft 201 and fixed onto the slide base 105, a timing gear 205 fixed to an output shaft 204a of the base rotating motor 204, and a timing belt 206 stretched between the timing gears 203 and 205. The output shaft 204a projects downward through the slide base 105. Numerals 207 and 208 denote support plates provided projectingly on both ends of the rotary base 202. In this configuration, the rotary base 202 is held on the slide base 105 horizontally rotatably.

The frame shape measuring section 200 has a measuring section 210 and a measuring element positioning means 250.

Measuring Section 210

As shown in FIG. 7, the measuring section 210 is provided with two guide rails 211 (one is not shown) which are laid bridgewise between the support plates 207 and 208, an upper slider 212 which is held on the guide rails 211 so as to be movable forward and backward in the longitudinal direction (horizontal direction), a measuring shaft 213 which extends vertically through one end portion in the moving direction of the upper slider 212, a roller 214 which is held at a lower end of the measuring shaft 213, an L-shaped member 215 provided at an upper end of the measuring shaft 213, and a feeler 216 provided at an upper end of the L-shaped member 215. A tip of the feeler 216 is aligned with the axis of the measuring shaft 213. The measuring shaft 213 is held by the upper slider 212 so as to be movable vertically and rotatable about the axis thereof.

The measuring section 210 is provided with a radius vector measuring means (contact element moving distance detecting means, rim width measuring means) 217 which measures and outputs a moving distance (radius vector $\rho_i$) of the upper slider 212 and the measuring element (contact element) 216 along the guide rails 211, and a measuring means 218 which measures and outputs a moving distance in the vertical direction (Z-axis direction) of the measuring shaft 213, i.e., a vertical moving distance $Z_i$ of the measuring element 216.

As the measuring means 217 and 218 there may be used magnescales or linear sensors. As to the structure thereof, an explanation thereof will here be omitted because it is known well. The measuring section 210 is further provided with a globe mold measuring element 219 disposed on an opposite end of the upper slider 212 and having a semi-cylindrical horizontal section and a rotary shaft 220 through which the globe mold measuring element 219 is attached to a projection 212a so that it can rise and fall in the moving direction of the upper slider 212, the projection 212a being formed on the opposite end of the upper slider 212.

The globe mold measuring element 219 is provided with a raising piece 219a positioned in the vicinity of the rotary shaft 220 and projecting on the side opposite to the measuring side and a switch operating piece 219b projecting sideways of the upper slider. A spring 221 is disposed between a side face of the upper slider 212 and a side face of a base portion of the raising piece 219a. In a fallen state of the globe measuring element 219 as in FIG. 7(a), the spring 221 is positioned above the rotary shaft 220 to retain the globe measuring element 219 in its fallen position, while in a raised state of the globe mold measuring element 219 as in FIG. 7(b), the spring 221 is positioned below the rotary shaft 220 to retain the globe mold measuring element 219 in its raised position.

In the raised position the globe mold measuring element 219 is prevented from falling to the right side in FIG. 7 by means of a stopper (not shown). Besides, on a side face of the upper slider 212 are provided a microswitch (sensor) 222 as means for detecting a fallen state of the globe mold measuring element 219, and a microswitch (sensor) 223 as means for detecting a raised state of the globe mold measuring element 219.

In the state shown in FIG. 7(a), if the measuring section moving motor 107 is operated, causing the slide base 105 to move leftward in FIG. 7, a tip of the raising piece 219a strikes against the globe mold feeler raising plate portion 111b of the globe mold holder 111, whereby the globe mold measuring element 219 is turned clockwise about the rotary shaft 220 against the resilience of the spring 221. With this turning motion, the spring 221 moves upward beyond the rotary shaft 220, whereupon the globe mold measuring element 219 is raised by the resilience of the spring 221 and the globe mold measuring element 219 is held in its raised position as in FIG. 7(b) under the action of both stopper (not shown) and the spring 221.

The microswitch 222 is turned ON directly by the measuring surface of the globe mold measuring element 219 when the measuring element 219 is in a fallen state, while the microswitch 223 is turned ON with the switch operating piece 219b when the globe mold measuring element 219 is in a raised state. Numeral 208a denotes a stopper provided on the support plate 208, numeral 224 denotes an arm attached to the support plate 208, and numeral 225 denotes a microswitch (sensor) attached to a front end of the arm 224. The microswitch 225 turns ON when the upper slider 212 comes into abutment against the slider stopper 208a to detect an initial position of the upper slider 212.

Measuring Force Adjusting Means PS

The measuring force adjusting means (measuring force changing means, pressing force adjusting means) PS is provided with two guide rails 251 (one is not shown) which are laid bridgewise between lower portions of the support plates 207 and 208 in parallel with the guide rails 211, a first lower slider 400 positioned below the arm 224 and held by the guide rails 251 so as to be movable in the longitudinal direction (the same direction as the upper slider 212), and a drive motor 401 positioned below the lower slider 400 and fixed to the rotary base 202. On a lower surface of the first lower slider 400 are arranged rack teeth 402 in the moving direction of the slider and a gear 403 meshing with the rack teeth 402 is fixed onto an output shaft 401a of the drive motor 401. Microswitches 404 and 405 for detecting the position of the first slider are fixed to the arm 224 spacedly in the moving direction of the first slider 400.

Further, a pulley 226 is held rotatably on a side face of an upper portion of the support plate 207, one end of a wire 227 is fixed to one end of the upper slider 212, one end of a spring 228 is anchored to an opposite end of the wire 227, and an opposite end of the spring 228 is secured to a front end of the first slider 400. The wire 227 is entrained on the pulley 226, Measuring Element Positioning Means 250

The measuring element positioning means 250 is provided with the above two guide rails 251 (one is not shown), a second lower slider 252 which is held by the guide rails 251 so as to be movable in the longitudinal direction, a drive motor 253 positioned below the lower slider 252 and fixed to the rotary base 202, and a retaining pin (stopper) 254 projected from a nearly central part of a side face of the rotary base 202 in proximity to the drive motor 253.

On a lower surface of the lower slider 252 are arranged rack teeth 255 in the moving direction of the slider, retaining pins (stoppers) 256 and 267 are projected from a side face of the lower slider 252 spacedly in the moving direction of the slider, and a gear 258 meshing with the rack teeth 255 is fixed to an output shaft of the drive motor 253. The retaining pin 256 is positioned slightly above the retaining pin 257, and a shaft lift operation member 259 is disposed sideways of the lower slider 252.

The shaft lift operation member 259 is formed in L shape by a long piece 259a disposed between the retaining pins 256 and 257 and a short piece 259b which is integral with a lower end of the long piece 259a obliquely downward. The shaft lift operation member 259 has a bent portion which is held at a vertically intermediate position of a side face of the lower slider 252 pivotably with a pivot shaft 260. Further, a spring 261 is disposed between a front end of the short piece 259b and an upper portion of a side face of the lower slider 252.

At a position at which the long piece 259a is in abutment against the retaining pin 256 the spring 261 is positioned above the pivot shaft 260 and urges the long piece 259a against the retaining pin 256, while at a position at which the long piece 259a is in abutment against the retaining pin 257 the spring 261 is positioned below the rotary shaft 260 and urges the long piece 259a against the retaining pin 257.

An upwardly extending support plate 262 is provided at one end of the lower slider 252 and a pressing shaft 263 extends through an upper end portion of the support plate 262 and is held so as to be movable forward and backward in the moving direction of the lower slider 252. An anti-dislodgment retainer 264 is attached to one end of the pressing shaft 263, an pressing portion 263a of a large-diameter which faces one end face 212b of the upper slider 212 is integral with an opposite end of the pressing shaft 263, and a spring 265, which is wound round the pressing shaft 263, is disposed between the pressing portion 263a of a large diameter and the support plate 262. With the resilience (biasing force) of springs 228 and 265 the pressing portion 263a is brought into abutment against the one end face 212b of the upper slider 252.

In the frame shape measuring apparatus 1 constructed as above, the shape of the glasses frame F or of a globe mold can be determined as a radius vector $\rho_i$ relative to the angle that is, as lens shape information $(\theta_i, \rho_i)$ of a polar coordinates type, as will be described later.

Control Circuit in the Globe Mold Measuring Apparatus

Figure 3:
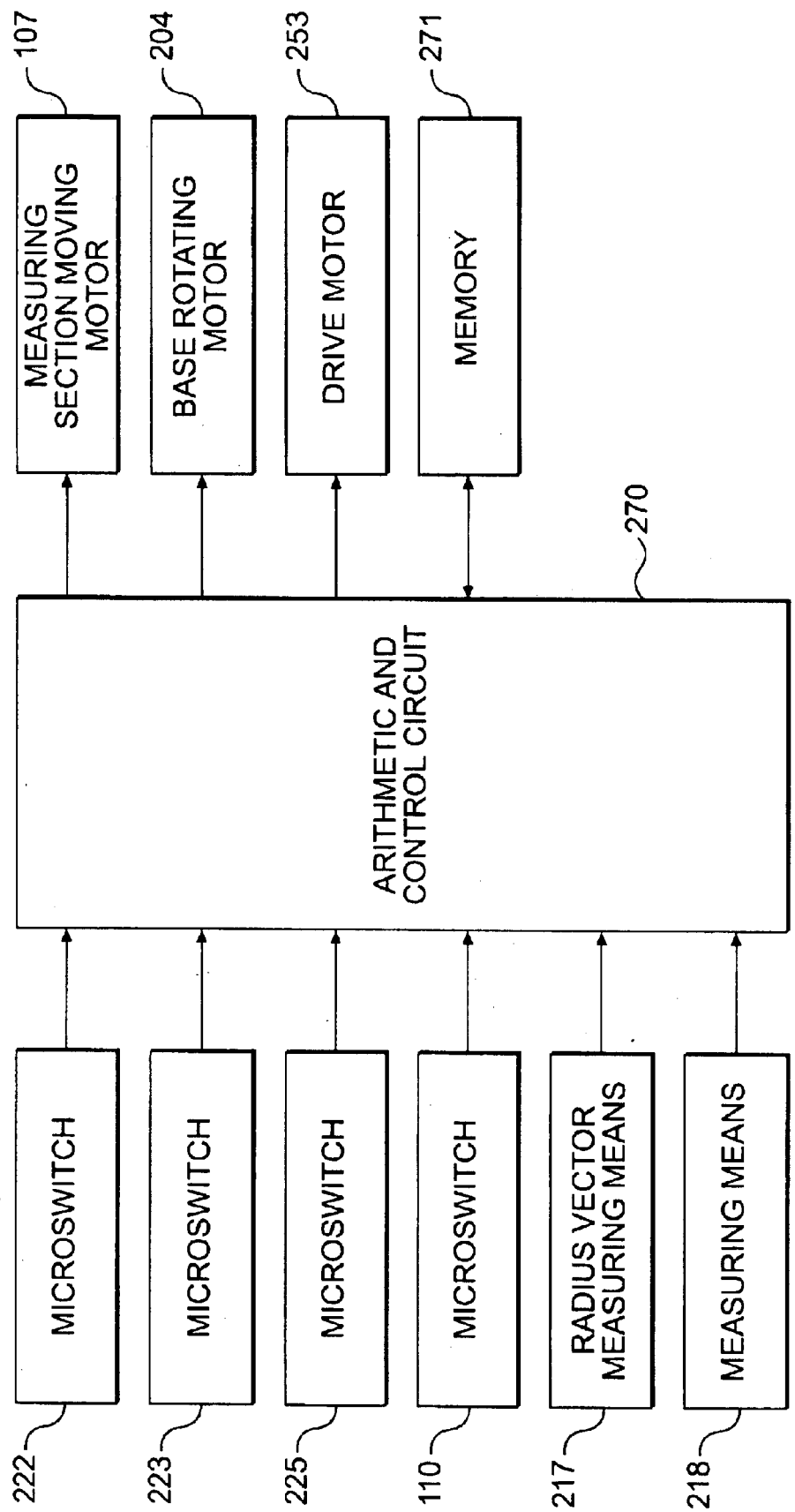
FIG. 3 is a control circuit diagram of a frame shape measuring apparatus shown in FIG. 2(a)

Detected signals from the microswitches 110, 222, 223, 225, 404, and 405 are inputted to an arithmetic and control circuit 270 shown in FIG. 3. Measurement signals from the radius vector measuring means 217 and the measuring means 218 are also inputted to the arithmetic and control circuit 270. The arithmetic and control unit 270 controls the operations of the measuring portion driving motor 107, base rotating motor 204, and drive motors 253 and 401. A memory (storage means) 271 for storing measurement data is connected to the arithmetic and control unit 270. The arithmetic and control unit 270 functions as frame shape recognizing means and measurement control means.

(2) Lens Edge Grinder 2

As shown in FIG. 2(a), the lens edge grinder 2 has a machining section 60 (details are omitted in the figure) for grinding the peripheral edge of a lens to be machined. In the machining section 60, a lens L (see FIG. 14) to be machined is held between a pair of lens rotating shafts 304 of a carriage (not shown), the rotation of the lens rotating shafts 304 and a vertical turning motion of the carriage are controlled in accordance with the lens shape information $(\theta_i, \rho_i)$, and the peripheral edge of the lens to be machined is ground with a rotating grindstone. Since this structure is well known, the details thereof will here be omitted.

The lens edge grinder 2 has an operating panel (keyboard) 61 as data input means and a liquid crystal display panel (display unit) 62 as display means. It is further provided with a control circuit (control means) 63 (see FIG. 1) which controls the machining section 60 and the liquid crystal display panel 62.

As shown in FIG. 9, the lens edge grinder 2 has a lens thickness measuring device (lens thickness measuring means) 300 which measures the edge thickness of the to-be-machined lens on the basis of the globe mold shape information, i.e., lens shape information $(\theta_i, \rho_i)$, obtained by the frame shape measuring apparatus 1, The construction and operation of the lens thickness measuring device 300 are the same as those described in detail in Japanese Patent Application No. 9468/1989.

Lens Thickness Measuring Means

The lens thickness measuring device (edge thickness/shape data input means) as the lens thickness measuring means (lens edge thickness measuring means) has a stage 331 which is moved back and forth by means of a pulse motor 336. The lens thickness measuring device 300 is also provided with feelers 332 and 334 which are provided on the stage 331 for pinching the lens L to be machined. The feelers 332 and 334 are urged toward each other by a pair of springs 338 so as to be kept in abutment against a front side (front refractive side) and a rear side (rear refractive side) of the lens L. As shown in FIG. 10(A), the feelers 332 and 334 have respective discs 332a and 334a of radius, r, which are journaled rotatably. The lens thickness measuring device is further provided with encoders 333 and 335 for detecting movement quantities of the feelers 332 and 334.

On the other hand, the lens rotating shafts 304 of the carriage (not shown) can be rotated by means of a pulse motor 337 and the lens L is pinched by the lens rotating shafts 304. Thus, the lens L can be rotated by the pulse motor 337. An optical axis OL of the lens L is aligned with the axis of the rotary shafts 304.

Radius vector information (angle information $\theta_i$' out of $\rho_i$ and $\theta_i$) provided from memory 90 is inputted to the pulse motor 337 and the lens L is rotated at an angle of $\theta_i$ from a reference position in accordance with the inputted angle. On the other hand, the radius vector $\rho_i$ is inputted to the pulse motor 336, causing discs 332a and 334a of the feelers 332 and 334 to move forward or backward through the stage 331 and be established their position at radius vector $\rho_i$ from the optical axis OL, as shown in FIG. 9. The encoders 333 and 335 detect movement quantities ai and bi shown in FIG. 10(A) of the feelers 332 and 334 at this position and detection signals provided from the encoders 333 and 335 are inputted to an arithmetic/decision circuit 91.

The arithmetic/decision circuit 91 calculates bi−ai=Di and Di−2r=Δi and obtains a lens thickness Δi.

Control Means, etc.

Figure 2B:
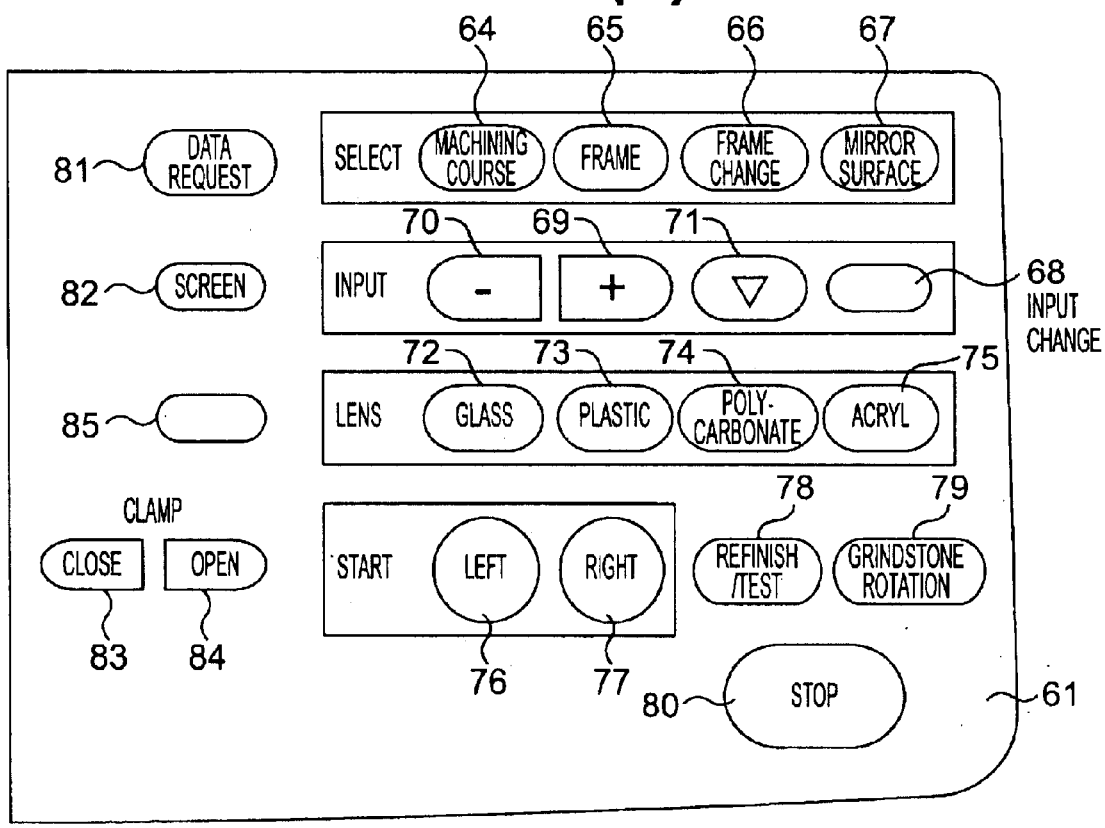
FIG. 2(b) is an enlarged explanatory diagram of a control panel shown in FIG. 2(a)

On the operating panel 61, as shown in FIG. 2(b), there are provided a machining course switch 64 which changes over between "AUTO" mode for grinding the lens edge and for V-grinding the lens edge and "MONITOR" for manual operation, a "FRAME" mode switch 65 for selecting the material of the glasses frame, a "FRAME CHANGE" mode switch 66, and a "MIRROR SURFACE" mode switch 67 for specular finish.

On the operating panel 61 are further provided an "INPUT CHANGE" mode switch 68 for changing inputs such as a pupil-to-pupil distance PD, a frame geometric center-to-center distance FPD, and an upper-side approaching quantity "UP", a "+" input setting switch 69, a "−" input setting switch 70, a cursor key 71 for moving a cursor frame 71a (FIG. 1), a switch 72 for selecting glass as lens material, a switch 73 for selecting plastic as lens material, a switch 74 for selecting polycarbonate as lens material, and a switch 75 for selecting acrylic resin as lens material.

Further provided on the operating panel 61 are such start switches as a "LEFT" lens grinding switch 76 and a "RIGHT" lens grinding switch 77, a "REFINISH/TEST" mode switch 78, a "GRINDSTONE ROTATION" switch 79, a stop switch 80, a data requesting switch 81, a screen switch 82, paired lens rotating shafts opening/closing switches 83 and 84, a lens thickness measurement starting switch 85, and a setting switch 86.

Figure 1:
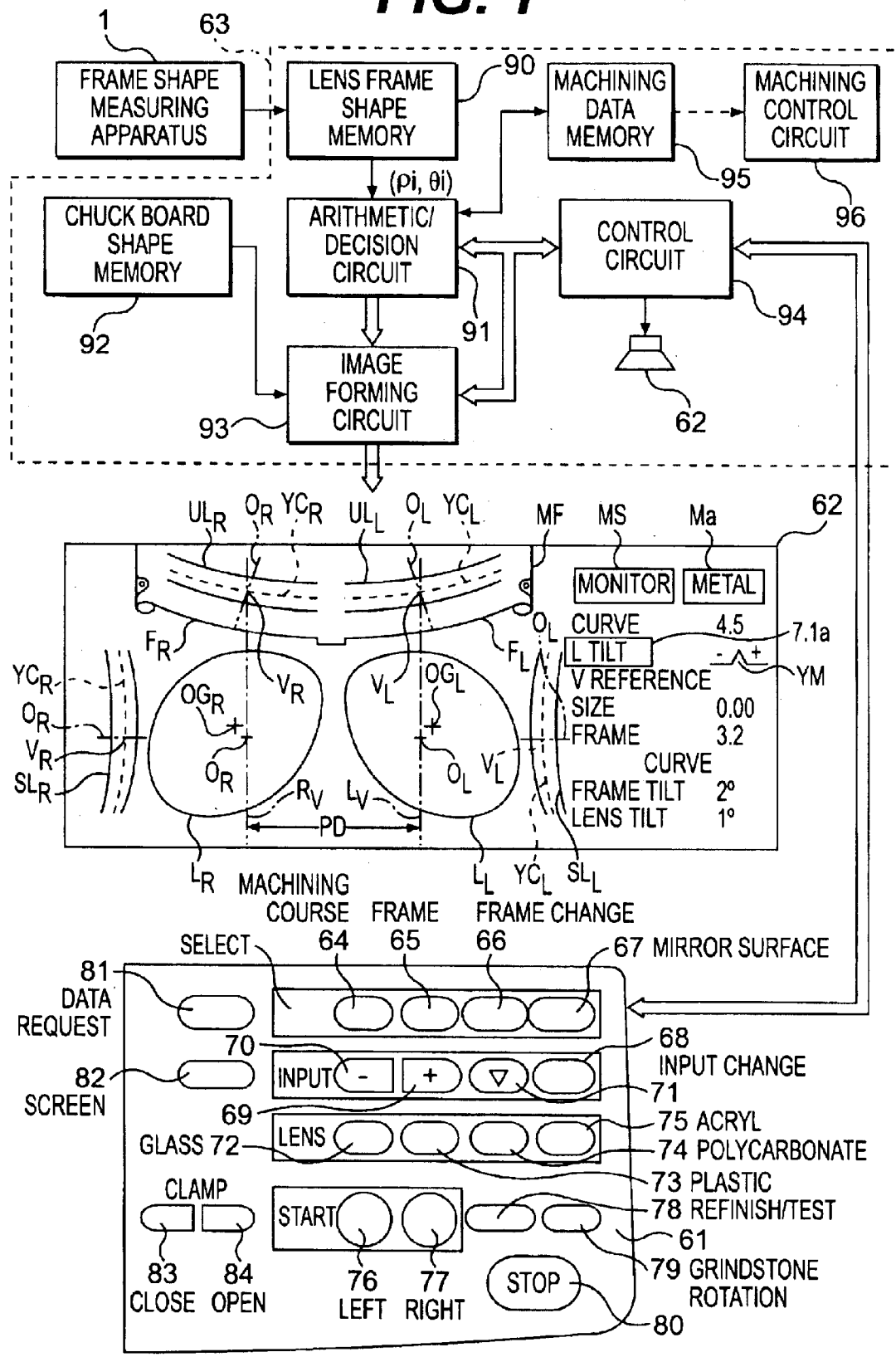
FIG. 1 illustrates a control circuit in a glasses lens fitness determining apparatus according to the present invention.

As shown in FIG. 1, the control circuit 63 comprises the lens frame shape memory 90 for storing lens shape information ($\theta_i$, $\rho_i$) provided from the frame shape measuring apparatus 1, the arithmetic/decision circuit (arithmetic and control circuit (computing means)) 91 to which the lens shape information ($\theta_i$, $\rho_i$) is inputted from the lens frame shape memory 90, a chuck board shape memory 92, an image forming circuit 93 which generates image data on the basis of data provided from the arithmetic/decision circuit 91 and data from the chuck board shape memory 92 and which causes the liquid crystal display panel (display means) 62 to display images and data, a control circuit 94 which controls the image forming circuit 93, the operating panel (V shape data input means) 61 and an alarm buzzer in accordance with control commands provided from the arithmetic/decision circuit 91 as arithmetic and control means, a machining data memory 95 which stores machining data obtained by the arithmetic/decision circuit 91, and a machining control circuit 96 which controls the operation of the machining section 60 described above.

Operation

The following description is now provided about controls made by the arithmetic and control circuit 270 and the arithmetic/decision circuit (arithmetic and control circuit) 91 in the apparatus constructed as above.

(i) Holding the Glasses Frame MF to the Frame Shape Measuring Apparatus 1

For measuring the shape of the glasses frame MF in the above construction, the globe mold holder 111 shown in FIGS. 7 and 8 is removed from the holder supporting piece 109. In this example, as shown in FIG. 6, the inclined guide plate portions 48c of the frame guide members 48 are inclined so as to become spaced apart more and more toward their upper ends.

Therefore, when the glasses frame MR is placed between the inclined guide plate portions 48c as in FIG. 6(a) and is pressed down from above against the biasing force of the extension spring 40, the spacing between the frame guide members 48, i.e., the spacing between the movable frames (sliders) 37, is widened under the guiding action of the inclined guide plate portions 48c and the rim, i.e., lens frame LF (RF), of the glasses frame MF is moved onto the holding pawls 43 and is held thereby. In this position, upper and lower portions of the lens frame (rim) LF (RF) are held between the vertical plate portions 48a of the frame guide members 48 by virtue of the extension spring 40.

In this state, if the operating lever 27 is turned from "OPEN" position to "CLOSE" position, this turning motion is transmitted to a sleeve 33 via the rotary shaft 25, gears 26, 24 and operating shaft 23, so that a part of the spring 35 is wound round the sleeve 33, whereby the pawl mounting plate 42 is turned upward around one side 42a thereof via the wire 36 which is contiguous to the spring 35, causing the spacing between the holding pawls 43 and 44 to be narrowed as in FIG. 6(c), and the rim, or the lens frame LF (RF), of the glasses frame MF is held between the holding pawls 43 and 44. In this position, the movable pin 31 is held at the lower end 20a of the arcuate slit 20 by virtue of the spring 32.

For removing the rim, or the lens frame LF (RF), of the glasses frame MR from the holding pawls 43 and 44, the operating lever 27 is operated in manner reverse to the above, whereby the associated components operate reverse to the above.

(ii) Measuring the Shape of the Globe Mold

A. Measuring the Shape of the Lens Frame (Globe Mold) of Glasses Frame

Measuring the Rim Width (Rim Thickness) of the Lens Frame

With the rim, or lens frame LF, of the glasses frame MF held between the holding pawls 43 and 44 of the movable frames 37 as described above, the measuring element 216 faces a nearly central part of the inside space of the lens frame LF from below, as shown in FIG. 6(c).

On the other hand, if a power supply of the frame shape measuring apparatus 1 is turned ON, signals provided from the microswitches 110, 222, 223, and 225 are inputted to the arithmetic and control circuit 270 (computing means) as an arithmetic/decision means arithmetic/decision control circuit) in the frame shape measuring apparatus 1. Then, as shown in FIG. 3, detection states of the microswitches 110, 222, 223, and 225 are judged by the arithmetic and control circuit 270. In FIG. 11(a), the long piece 259a of the shaft lift operation member 259 is abutted against the retaining pin 257 by virtue of the spring 261. In this position the measuring element 216 assumes a stand-by position (Pa). In connection with measurement, a description will be given later about the state in which, for example, the lens frame LF of the glasses frame MF is first subjected to measurement and thereafter the lens frame RF is measured.

If the start switch 13 is turned ON at the stand-by position (Pa), the arithmetic and control circuit 270 controls the operation of the measuring section moving motor 107, causing the feed screw 206 to rotate and thereby causing the slide base 105 to move toward the measuring section moving motor 107. As a result, the rotary base 202 is moved together with the slide base 105 toward the measuring section moving motor 107 and the measuring element 216 on the measuring shaft 213 supported by the upper slider 212 of the rotary base 202 is brought into abutment against the vertical plate portion 48a of one of the movable frames 37 as in FIG. 12(a). The arithmetic and control circuit 270 receives a detection signal from the radius vector measuring means 217 upon abutment of the measuring element 216 against the vertical plate portion 48a of one movable frame 37 and turns OFF the measuring section moving motor 107.

At this time, the arithmetic and control circuit 270 determines a moving distance of the slide base 105 on the basis of a drive quantity of the measuring section moving motor 107 until stop of the same motor, then determines the position of the measuring element 216 on the basis of the said moving distance and the detection signal from the radius vector measuring means 217, and causes the position thus determined to be stored as a rim outer surface position in memory 271.

Thereafter, the arithmetic and control circuit 270 causes the measuring section moving motor 107 to rotate reverse, thereby causing the slide base 105 to move in the direction opposite to the motor 107 up to a position at which the measuring element 216 faces a nearly central part of the inside space of the lens frame LF, and turns OFF the motor 107.

Next, the arithmetic and control circuit 270 causes the drive motor 253 to operate, causing the gear 258 to turn clockwise as indicated with arrow A1, thereby causing the lower slider 252 to move rightward in the figure and the upper slider 212 to be moved rightward in the figure as indicated with arrow A2 by the pressing shaft 263, allowing the long piece 259b of the shaft lift operation member 259 to come into abutment against the retaining pin 254.

Thereafter, the arithmetic and control circuit 270 causes the lower slider 252 to move rightward, causes the shaft lift operation member 259 to turn clockwise about the rotary shaft 260 as indicated with arrow A3, and causes the measuring shaft 213 to move upward (rise) from the standby position (Pa) through the roller 214 by means of the shaft lift operation member 259. With consequent movement of the spring 261 to a position above the rotary shaft 260, the shaft lift operation member 259 is suddenly turned upward by virtue of the spring 260 and the long piece 259a of the shaft lift operation member 259 strikes against the retaining pin 254. With a consequent inertia force, the measuring shaft 213 is moved upward and the measuring element 216 is raised abruptly up to a jump-up position (Pb) corresponding substantially to an upper edge of the lens frame LF.

Thereafter, the measuring shaft 213 and the measuring element 216 move down slightly, the roller 214 comes into abutment against the short piece 259b, and the measuring element 216 is brought to a measuring element inserting position (feeler inserting position) (Pc) which faces a trough of V groove (lens frame groove) in the lens frame LF as in FIG. 11(c).

When the measuring element 216 is thus raised up to the measuring element inserting position (Pc), the microswitch 225 is turned ON by the upper slider 212. Then, upon receipt of an ON signal from the microswitch 225 the arithmetic and control circuit 270 causes the drive motor 263 to rotate reverse, thereby causing the gear 258 to turn counterclockwise as indicated with arrow A4 in FIG. 11(b) and the lower slider 252 to move leftwards as indicated with arrow A5, whereby the tip of the measuring element 216 is engaged with trough (center) of V groove (lens frame groove) 51 in the lens frame LF as in FIGS. 8(b) and 12(b).

When the arithmetic and control circuit 270 receives a detection signal from the radius vector measuring means 217 upon abutment of the tip of the measuring element 216 against the trough of the V groove 51 in the lens frame LF, it turns OFF the drive motor 263. At this time, the arithmetic and control circuit 270 determines the position of the measuring element 216 on the basis of the drive quantity of the drive motor 253 and the detection signal from the radius vector measuring means 217 and causes this position to be stored in memory 271 as a rim groove position (V groove position, lens frame groove position). Then, the arithmetic and control circuit 270 determines a difference between the position of the rim outer surface and the rim groove position and stores it in memory 271 as a rim width (rim thickness) Lt of the lens frame LF.

As shown in FIG. 18, the arithmetic and control circuit 270 can numerically display the rim thicknesses of right and left lens frames FR, FL instead of side images of glasses lenses inserted into the lens frames FR and FL on the liquid crystal display panel (display unit) 62 shown in FIG. 1.

B. Measuring the Lens Shape in the Ordinary Type of Lens Frame

Figure 12B:
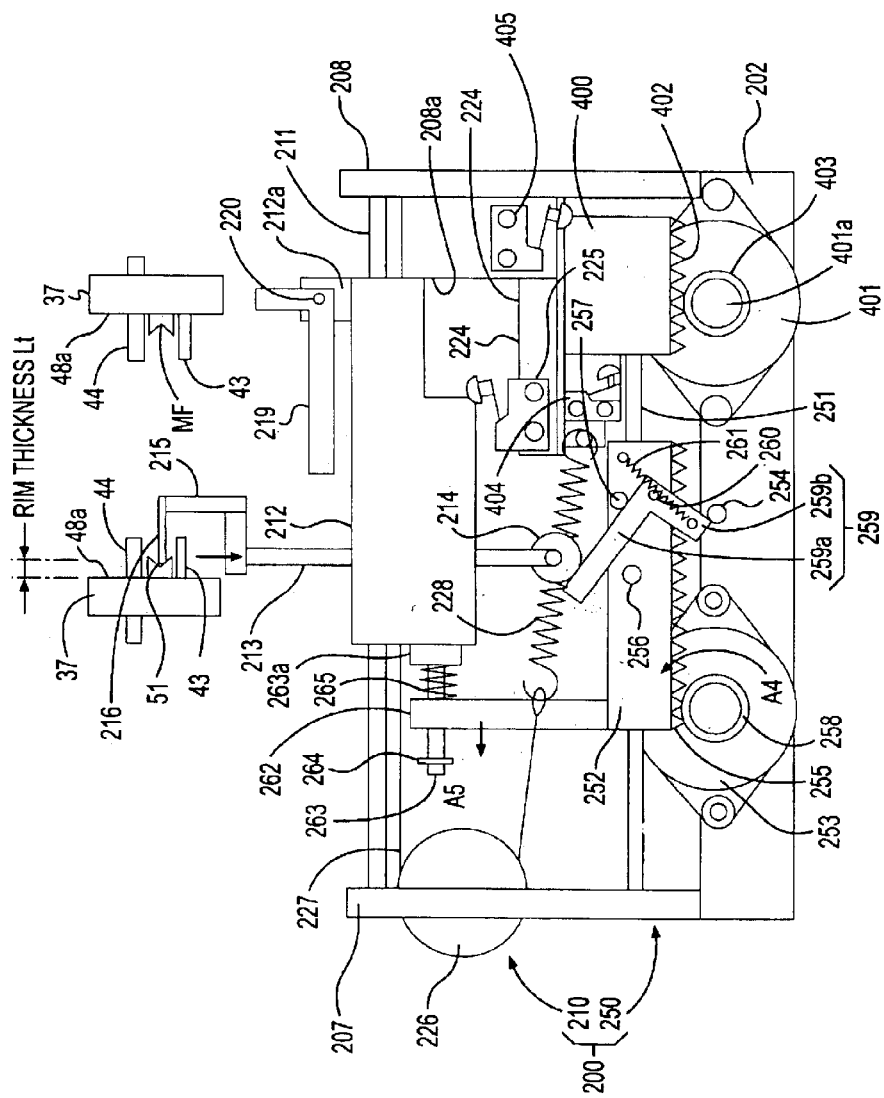

Thereafter, when the lower slider 252 is moved leftward as indicated with arrow A5 in FIGS. 11(b) and 12(b), the pressing portion 263a of the pressing shaft 263 is moved away from the upper slider 252 as shown in FIG. 8(b). In this position, the measuring element 216 comes into abutment against the trough of the V groove (rim groove or lens frame groove) 51 in the lens frame LF as in FIG. 8(b) and is pressed against the trough with the biasing force of the spring 228.

In this state, the arithmetic and control circuit 270 causes the base rotating motor 204 to rotate, causing the tip of the measuring element 216 to move along the V groove of the lens frame LF. In this case, the upper slider 212 is moved along the guide rails 211 in accordance with the shape of the V groove and the measuring shaft 213 is moved vertically in accordance with the V groove shape.

The movement of the upper slider 212 is detected by the radius vector measuring means 217, while the vertical movement of the measuring shaft 213 is detected by the measuring means 218.

The radius vector measuring means 217 detects a moving distance of the upper slider 212 from the abutted position against the stopper 208a of the support plate 208. Outputs from the measuring means 217 and 218 are inputted to the arithmetic and control circuit 270.

The arithmetic and control circuit 270 determines a radius vector $\rho_i$ of the V groove trough in the lens frame LF on the basis of the output provided from the measuring means 217, makes the radius vector $\rho_i$ into radius vector information ($\theta_i$, $\rho_i$) correspondingly to the rotational angle $\theta_i$ of the base rotating motor 204, and causes the radius vector information ($\theta_i$, $\rho_i$) to be stored in memory (not shown). On the other hand, the arithmetic and control unit determines a moving distance $Z_i$ in the vertical direction (Z-axis direction) on the basis of the output provided from the measuring means 218, makes the moving distance $Z_i$ corresponding to both rotational angle $\theta_i$ and radius vector $\rho_i$ to obtain globe mold shape information ($\theta_i$, $\rho_i$, $Z_i$), and causes the globe mold shape information ($\theta_i$, $\rho_i$, $Z_i$) to be stored in memory 271.

C. Specifying a Lens Frame for Half Glasses and Measuring the Shape Thereof

The following description is now provided about measuring a half glasses frame 272F having a lens frame 272 for half glasses such as that shown in FIG. 13.

(1) Measurement Example 1

Figure 13A:
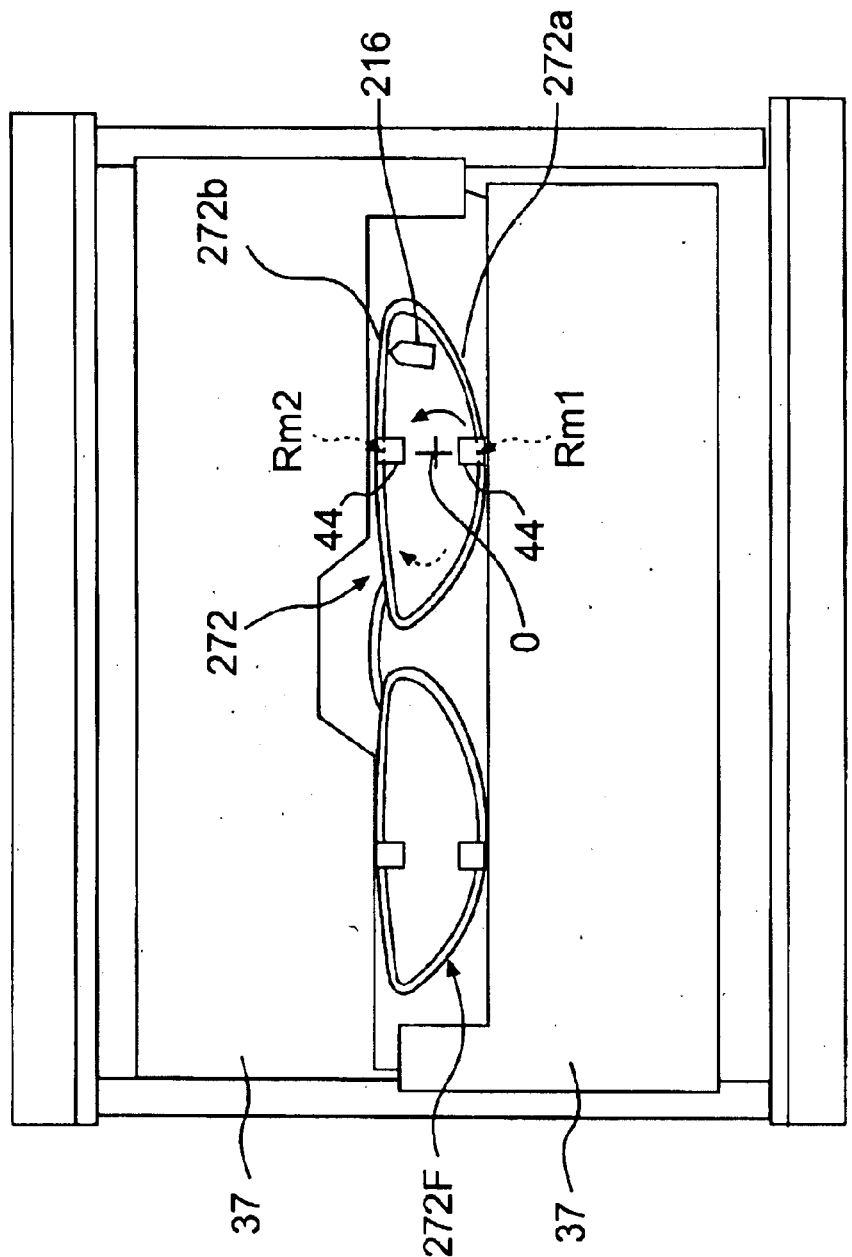

First, the lens frame 272 for half glasses is pinched between the movable frames 37 as in FIG. 13(A) and the arithmetic and control circuit 270 is allowed to judge whether the lens frame to be measured is a lens frame of half glasses or an ordinary type of a lens frame.

The position corresponding to the center between the movable frames 37 and the center of the lens frame 272 (the center between rims 272a and 272b) serves as a movement start position of the tip of the measuring element 216. Further, when the lens frame 272 for half glasses is seen from the front side thereof, a position near the center of the rim 272a as a lower rim of the lens frame 272 is assumed to be a measurement start position Rm1. The rim 272b is an upper rim of the lens frame 272.

Figure 13B:
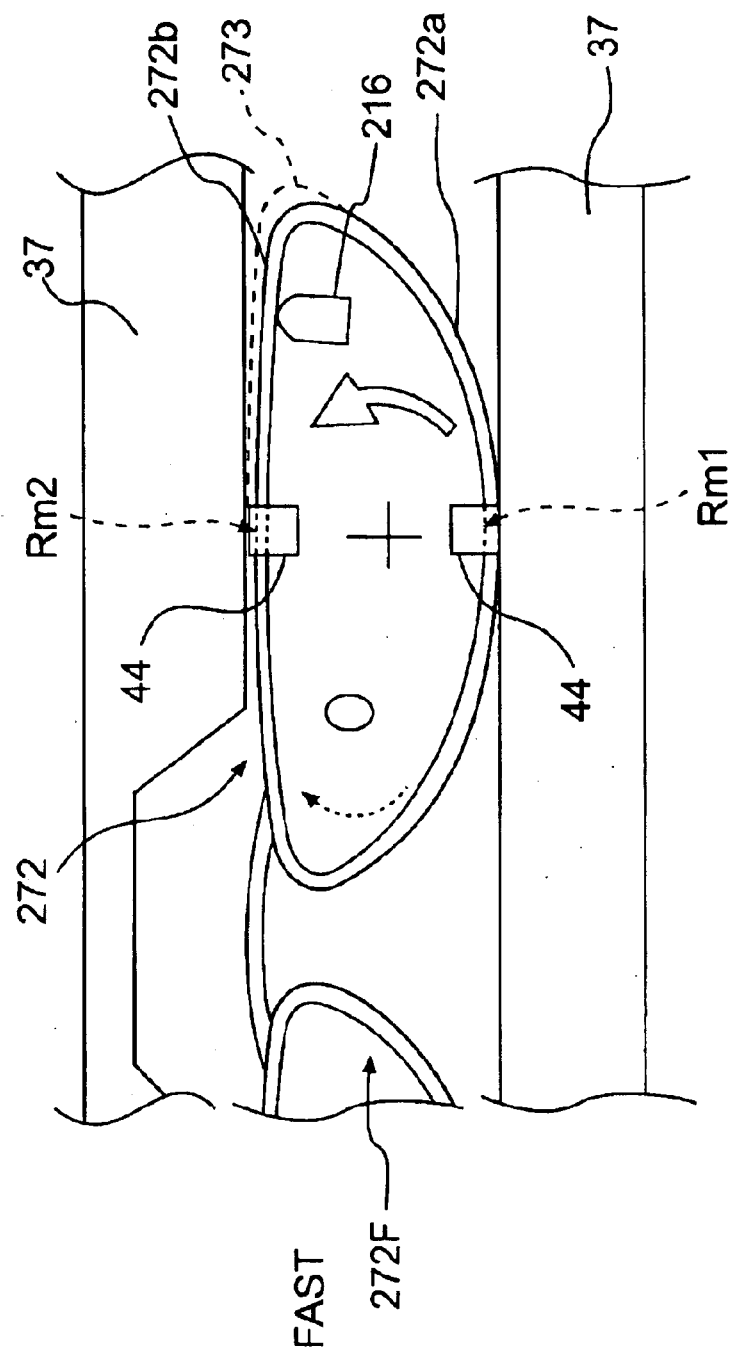
Figure 13C:
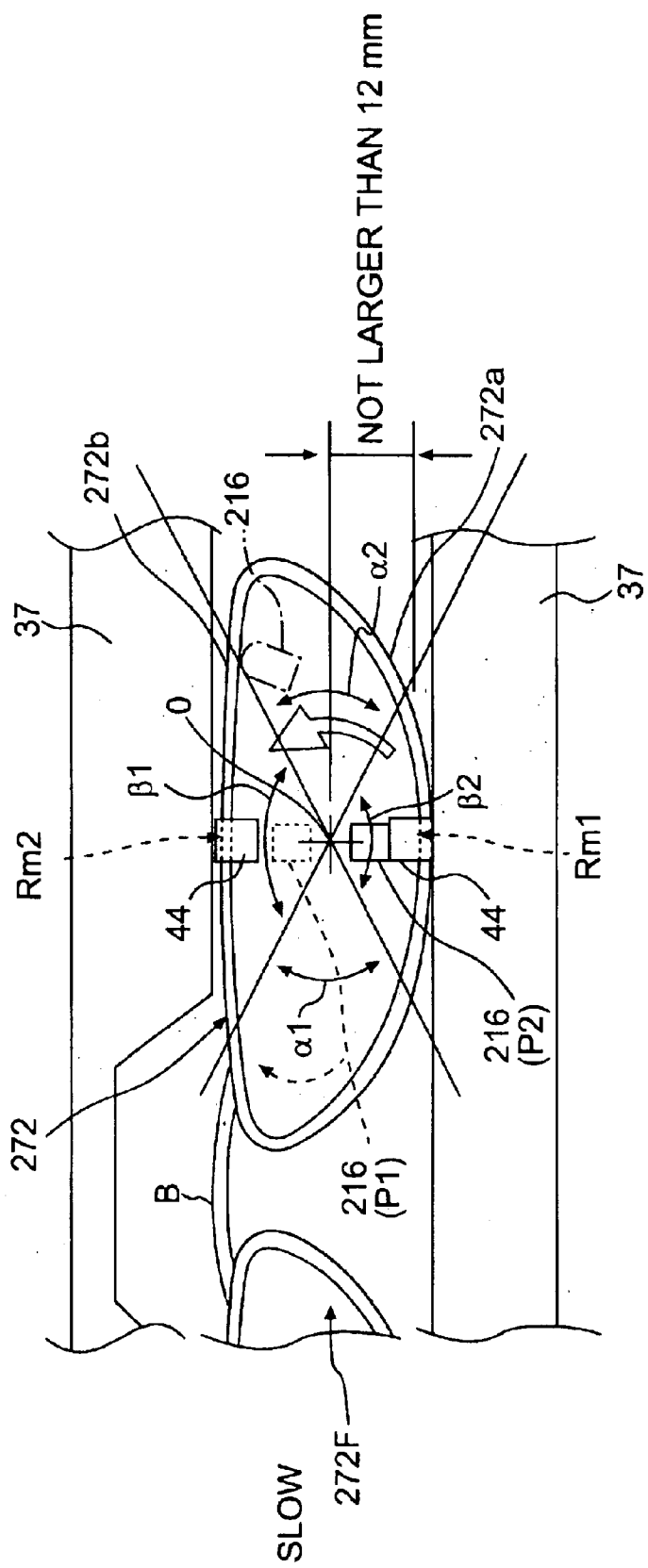

With the upper slider 212 located in its position shown in FIG. 11(b) by the driver motor 253, the arithmetic and control circuit 270 controls the operation of the drive motor 107 to move the slide base 105 and the upper slider 212 in the right and left direction, and at the same time the arithmetic and control circuit 270 controls the operation of the drive motor 204 to rotate the rotary shaft 201 and the rotary base 202, causing the tip of the measuring element 216 to assume the movement start position P1 in FIG. 13(c).

In the movement start position P1, the tip of the measuring element 216 confronts a lens frame groove (not shown) (substantially the same shape as the V groove 51) of the lens frame 272 at the center (measurement start position Rm1) of the lower rim 272a.

Next, the arithmetic and control circuit 270 controls the operation of the drive motor 258 to move the lower slider 252 leftwards as indicated with arrow A5 in FIG. 12(b), thereby causing the pressing portion 263a to move leftwards. At this time, with the biasing force of the spring 228, the upper slider 212 moves leftwards following the movement of the pressing portion 263a, and the tip of the measuring element 216 moves up to a position P2 near the center of the lower rim 272a of the lens frame 272 in FIG. 13(c) and comes into abutment at the measurement start position Rm1 against the V groove (same as the V groove 51) (not shown) of the lens frame 272.

Thereafter, the arithmetic and control circuit 270 further controls the operation of the drive motor 253 to move the lower slider 252 further leftwards as indicated with arrow A5 in FIG. 12(b), thereby causing the pressing portion 263a to move leftwards and hence away from the upper slider 212 as in FIG. 8(b).

At this time, the arithmetic and control circuit 270 makes control to let the radius vector measuring means (contact element moving distance detecting means) 217 detect a moving distance of the measuring element (contact element) 216 from the movement start position P1 to the position P2 at which the measuring element 216 first abuts the lower rim 272a. Then, from the thus-detected moving distance of the measuring element 216 the arithmetic and control circuit (lens frame shape identifying means) 270 identifies the lens frame shape of glasses. More specifically, the arithmetic and control circuit 270 determines the distance from a rotational center O of the measuring element 216 to the measurement start position Rm1 on the basis of a measured signal provided from the radius vector measuring means 217, and if the distance thus determined is not larger than a predetermined value (say, 12 mm), the arithmetic and control circuit judges that the measured lens frame is the lens frame 272 for half glasses.

It is here assumed that the number of revolutions of the drive motor 204 in measuring an ordinary type of a lens frame is N rpm and that the operation of the drive motor 204 is controlled at that number of revolutions to rotate the rotary shaft 201 and the rotary base 202, thereby causing the measuring element 216 to rotate (about the rotational center O) and allowing the measurement of the lens frame shape to proceed. If the rotating speed of the measuring element 216 at this time is assumed to be a normal rotating speed (Fast), then in the case where the lens frame 272 for half glasses as the lens frame being measured is formed of a soft material or the like and the shape of the lens frame 272 is measured by the measuring element 216 which rotates (moves) at the normal rotating speed, the lens frame 272 for half glasses is deformed with the moving force of the measuring element 216 as indicated with a broken line 273 in FIG. 13(B). More specifically, the ear or nose contacting side of the lens frame 272 is deformed and deflects, making an accurate measurement of radius vector impossible.

To avoid such an inconvenience, when the lens frame measured in the above manner is judged to be the lens frame 272 for half glasses, a shift is made to a slow rotation sequence in which the arithmetic and control circuit 270 controls the rotating speed of the drive motor 204 to a speed NS rpm (e.g., NS=N/2 rpm) lower than N rpm, thereby decreasing the moving speed of the measuring element 216, i.e., the rotating speed of the rotary shaft 201 and the rotary base 202.

In accordance with this slow rotation sequence the arithmetic and control circuit 270 causes the measuring element 216 to measure the shape of the lens frame 272 for half glasses. In this case, the rotating speed of the measuring element 216 is sufficiently lower than the normal rotating speed, so that the measuring element 216 makes the measurement without causing such a deformation of the rim of the lens frame 272 as in FIG. 13(C).

Thus, since the ear or nose contacting side of the lens frame for half glasses formed of a soft material undergoes neither deformation nor deflection, there no longer is any inaccurate measurement of the lens frame shape caused by such deformation and deflection and it is possible to realize an accurate lens frame shape measurement.

(2) Measurement Example 2

A modification may be made such that in a predetermined angular range α1 on the nose contacting side of the lens frame 272 for half glasses or in a predetermined angular range α2 on the ear contacting side thereof the arithmetic and control circuit (movement speed control means) 270 can decreases (low speed) the rotating speed of the measuring element (contact element) 216, while in other ranges β1 and β2 the arithmetic and control circuit 270 makes control to change the rotating speed of the measuring element 216 into the normal rotating speed.

In this case, the speed at a rim deformation-prone portion in the predetermined nose contacting-side angular range α1 or the ear contacting-side angular range α2 of the lens frame 272 for half glasses becomes slow, so at this portion the lens frame 272 for half glasses is not deformed under the rotating speed of the measuring element 216. Besides, in the angular ranges β1 and β2 the upper and lower rims 272a, 272b of the lens frame 272 approach a straight line, so even if the moving speed of the measuring element 216 is increased to the normal rotating speed in the angular ranges β1 and β2, the upper and lower rims 272a, 272b are not deformed with rotation of the measuring element 216. Therefore, by increasing the moving speed of the measuring element 216 to the normal rotating speed in the angular ranges β1 and β2, the time required for measuring the shape of the lens frame 272 can be rendered shorter than in the previous Measurement Example 1 described in paragraph (1).

(3) Measurement Example 3
Preliminary Measurement

First, the lens frame 272 for half glasses is held between the movable frames 37 and by the following preliminary measurement the arithmetic and control circuit 270 is allowed to judge whether the lens frame to be measured is a lens frame for half glasses or is an ordinary type of a lens frame.

More specifically, the arithmetic and control circuit 270 first allows the measuring element (feeler, contact element) 216 to assume a measurement start position Rm1 which corresponds to an approximately central port of the lower rim when seen from the front side of the lens 272 for half glasses. That is, the arithmetic and control circuit 270 controls the operation of the drive motor 204, causing the rotary shaft 201 and the rotary base 202 to be positioned so that the measuring element 216 comes into abutment against the groove of the lens frame 272 at the center (measurement start position Rm1) of the lower rim 272a of the lens 272. At this time, from a measurement signal provided from the radius vector measuring means 217 the arithmetic and control circuit 270 determines a radius vector $\rho_0$ of the lens frame 272 at the measurement start position Rm1 and stores it in memory 271.

Next, the arithmetic and control circuit 270 controls the operation of the drive motor 204 to rotate the rotary shaft 201 approximately 180° and the rotary base 202 also approximately 180°, causing the measuring element 216 to move from the measurement start position Rm1 up to a position Rm2 near the center of the upper rim 272b when seen from the front side of the lens frame 272. When the measuring element 216 has been moved up to a position Rm2 on the side approximately opposite to the measurement start position Rm1, the arithmetic and control circuit 270 determines a radius vector $\rho_{180}$ of the lens frame 272 for half glasses at the position Rm2 on the basis of a measurement signal provided from the radius vector measuring means 217 and stores it in memory 271. Next, the arithmetic and control circuit 270 determines the sum of the radius vector $\rho_0$ at the measurement start position Rm1 and the radius vector $\rho_{180}$ at the position Rm2, as a spacing D($=\rho_0+\rho_{180}$), then calculates a half D/2 of the spacing D, and when D/2 is not larger than a predetermined value (say, 12 mm), the arithmetic and control circuit 270 judges that the lens frame being measured is the lens frame 272 for half glasses.

Main Measurement

It is here assumed that the number of revolutions of the drive motor 204 in measuring a ordinary type of a lens frame is N rpm and that the operation of the drive motor 204 is controlled at that number of revolutions to rotate the rotary shaft 201 and the rotary base 202, thereby causing the measuring element 216 to rotate (about the rotational center O) and allowing the measurement of the lens frame shape to proceed. If the rotating speed of the measuring element 216 is assumed to be a normal rotating speed, then in the case where the lens frame 272 for half glasses as the lens frame being measured is formed of a soft material or the like and the shape of the lens frame 272 is measured by the measuring element 216 which rotates (moves) at the normal rotating speed, the lens frame 272 for half glasses is deformed with the moving force of the measuring element 216 as indicated with a broken line 273. In more particular terms, the ear or nose contacting side of the lens frame 272 is deformed and deflects, making an accurate measurement of radius vector impossible.

In view of this point, when the lens frame measured in the above manner is judged to be the lens frame 272 for half glasses, a shift is made to a slow rotation sequence in which the arithmetic and control circuit 270 controls the rotating speed of the drive motor 204 to a speed NS rpm (e.g., NS=N/2 rpm) lower than N rpm, thereby decreasing the moving speed of the measuring element 216, i.e., the rotating speed of the rotary shaft 201 and the rotary base 202.

Then, in accordance with this slow rotation sequence the arithmetic and control circuit 270 causes the measuring element 216 to measure the shape of the lens frame 272 for half glasses. In this case, since the rotating speed of the measuring element 216 is sufficiently lower than the normal rotating speed, the measuring element 216 makes the measurement without causing such a deformation of the rim of the lens frame 272 as in FIG. 13(C).

The portion of the lens frame 272 for half glasses measured while changing the rotating speed by the measuring element 216 is not limited to the ear or nose contacting side of the lens frame 272, but may cover the whole circumference of the lens frame.

In the present invention, moreover, the portion to be measured while changing the rotating speed by the measuring element 216 may be set arbitrarily. To be more specific, "Measuring Portion" setting keys (Ear, Nose, Eyebrow, Cheek, Any) may be provided in either the frame shape measuring apparatus 1 or the lens edge grinder 2, then after setting a measuring portion, the set portion may be displayed in color or with a thick or blinking line on the globe mold shape displaying screen.

Thus, since the ear or nose contacting side of the lens frame for half glasses formed of a soft material or the like is not deformed or deflected, there does not occur any inaccurate measurement of the lens frame shape caused by such deformation or deflection, that is, an accurate lens frame shape measurement can be realized.

Not only by changing the rotating speed but also by changing the rotational direction of the measuring element 216 it is possible to realize an accurate measurement of the lens frame for half glasses without any inaccurate measurement caused by deformation or deflection of the lens frame.

For example, in such a lens frame 272 for half glasses as shown in FIG. 13, the lower rim 272a is largely curved o the left and right, nose and ear contacting sides up to the upper rim 272b, while the upper rim 272b is curved small at its left and right portions. In such a case, when the measuring element 216 is moved in the direction of a solid-line arrow from the lower rim 272a to the upper rim 272b in contact with the lens frame 272, if an abrupt deforming force acts on the ear contacting side of the upper rim 272b, the upper rim undergoes such a deformation as indicated with a broken line. In this connection, a bridge B is provided on the nose contacting side (left-hand side) of the upper rim 272b, so when the measuring element 216 is moved from the lower rim 272a to the upper rim 272b in the direction of a broken-line arrow in contact with the lens frame 272, even if an abrupt deforming force acts on the nose contacting side of the upper rim 272b, the ear contacting side (right-hand side) of the upper rim is prevented from undergoing such a deformation as indicated with a broken line by means of the bridge B.

Therefore, it is preferable that the following measurement control be made by the arithmetic and control circuit 270 as measurement control means.

In the case where the lens frame to be measured is such a lens frame 272 as shown in FIG. 13, the arithmetic and control circuit 270 judges that the lens frame 272 is a lens frame for half glasses and that the lower rim 272a of the lens frame 272 is curved largely at its right and left portions, while the upper rim 272b is curved small at its right and left portions. In this case, the arithmetic and control circuit 270 makes control to move the contact element 216 in the direction indicated with a dotted-like arrow in FIG. 13(B). That is, the arithmetic and control circuit 270 makes control so that the contact element 216 rotate moves from the lower rim 272a toward the upper rim 272b in contact with the lens frame on the nose contacting side (bridge B side). As a result, there is attained a contact measurement state in which the upper rim 272a does not undergo any abrupt deforming force from the contact element 216 on the ear contacting side. Thus, by rotating the measuring element 216 in the dotted-line arrow direction in FIG. 13(B) it is possible to diminish the shape deformation of the lens frame on the ear contacting side.

By controlling the rotation of the measuring element 216 in combination with the slow rotation sequence there no longer occurs any inaccurate measurement of the lens frame shape caused by deformation and deflection of the lens frame and it is possible to realize an accurate lens frame shape measurement. This is also true of the case where the moving speed of the measuring element 216 is high.

D. Changing the Measuring Force (Measuring Pressure)

(i) Measuring Force Changing Example 1

In the Measurement Examples (1) to (3) described above, when the arithmetic and control circuit 270 judges that the lens frame to be measured is not a lens frame for half glasses, it controls the operation of the drive motor 401 so that the first slider 400 is moved toward the support plate 208 by the gear 403 which rotates together with the output shaft 401a of the drive motor 401 and the rack teeth 402. With this movement, the lower slider 400 turns ON the microswitch 405. This ON signal is inputted to the arithmetic and control circuit 270, which in turn turns OFF the drive motor 401 while the slider 400 is positioned on the support plate 208 side. In this state, the slider 401 is positioned on the rightmost side where the force of pulling the spring 228 is large.

In this case, therefore, the pressing force (measuring force=measuring pressure) of the measuring element 216 against the lens frame is strong and the rotating speed (moving speed) of the measuring element is as high as in the case of measuring an ordinary type of a lens frame.

In the above Measurement Examples (1) to (3), when the arithmetic and control circuit 270 judges that the lens frame to be measured is a lens frame for half glasses, it causes the drive motor 401 to rotate reverse to the above (controls the operation of the drive motor), causing the first slider 400 to be moved to the side opposite to the support plate 208 by the gear 403 which rotates together with the output shaft 401a of the drive motor 401 and the rack teeth 402. With this movement, the lower slider 400 turns ON the microswitch 404. This ON signal is inputted to the arithmetic and control circuit 270, which in turn causes the drive motor 401 to turn OFF. Since in this state the lower slider 400 has moved a predetermined distance to the support plate 207 side, the force of pulling the spring 228 is weaker than in the case where the lower slider 400 is positioned closest to the support plate 208.

Thus, in the case where the lens frame to be measured is a lens frame for half glasses, the pressing force (measuring force=measuring pressure) of the measuring element 216 against the lens frame 272 for half glasses is weakened and at the same time the rotating speed (moving speed) of the measuring element 216 is made lower than in the case of measuring an ordinary type of a lens frame as in the above Measurement Examples (1) to (3), or the rotating speed (moving speed) of the measuring element 216 is made lower than in the case of measuring an ordinary type of a lens frame in predetermined angular ranges on the nose and ear contacting sides of the lens frame 272, whereby the deformation and deflection on the nose and ear contacting sides of the lens frame 272 are made still smaller and hence it is possible to enhance the measurement accuracy.

(ii) In the measurement example of D.(i) described above, the rotating speed (moving speed) of the measuring element 1 in case of measuring the lens frame 272 for half glasses is set lower than in the measurement of an ordinary type of a lens frame and the pressing force of the measuring element 216 against the lens frame 272 during measurement is set smaller than the normal measuring force, but limitation is not always made thereto.

A modification may be made such that in case of measuring the lens frame 272 for half glasses, the rotating speed (moving speed) of the measuring element 216 is not controlled lower than in the measurement of an ordinary type of a lens frame, but only the pressing force (measuring force= measuring pressure) of the measuring element 216 against the lens frame 272 during measurement is set smaller than the normal measuring force.

(iii) A modification may also be made such that in the case where the rim width of a lens frame measured in the above A, is smaller than a predetermined value and hence the lens frame is apt to be deformed, the measuring force of the measuring element 216 is set small as in the above D.(i) to further diminish the deformation and deflection on the nose and ear contacting sides of the lens frame caused by the pressing force of the measuring element, thereby enhancing the measurement accuracy. This control, which is performed by the arithmetic and control circuit 270, may be applied not only to the lens frame 272 for half glasses but also to an ordinary type of a lens frame.

Further, in the case where the rim width of a lens frame measured in the above A, is smaller than the predetermined value and hence the lens frame is apt to be deformed, the rotating speed (moving speed) of the measuring element 216 may be set smaller also in measuring an ordinary type of a lens frame as is the case with measurement of the lens frame 272 for half glasses. In this case, the measuring force of the measuring element 216 may be set small.

E. Others

There may be used a spacing measuring means for measuring the spacing between the movable frames 37 as a spacing between the upper and lower rims of a lens frame held between both movable frames, and judgment may be made in such a manner that a half of the spacing thus determined is not larger than a predetermined value (say, 12 mm). In this case the measurement time can be shortened because the main measurement can be conducted immediately without making the preliminary measurement. As the spacing measuring means there may be adopted, for example, a linear encoder, a rotary encoder, a magnescale, or a potentiometer.

Measuring the Shape of a Globe Mold Such as Templet or Demonstration Lens

In measuring the shape of a globe mold such as a templet or a demonstration lens with use of the globe mold holder 111 as in FIG. 7(a), the measuring section moving motor 107 is turned ON to move the slide base 105 leftwards in FIG.

7. As a result, the tip of the raising piece 219a strikes against the globe mold feeler raising plate portion 111b of the globe mold holder 111, whereby the globe mold measuring element 219 is turned clockwise about the rotary shaft 220 against the biasing force of the spring 221 and the microswitch 222 is turned OFF.

With this rotation, when the spring 221 moves upward beyond the rotary shaft 220, the globe mold measuring element 219 is raised with the biasing force of the spring 221 and is held in its raised position as in FIG. 7(b) by the action of both stopper (not shown) and spring 221. In this raised position the microswitch 223 is turned ON by the switch operating piece 219b of the globe mold measuring element 219 and this ON signal is inputted to an arithmetic and control circuit (not shown).

Upon receipt of this ON signal from the microswitch 223 the arithmetic and control circuit turns ON the drive motor 253, causing the gear 258 to turn counterclockwise and the lower slider 252 to move leftward, thereby causing the pressing portion 263a of the pressing shaft 263 to move away from the upper slider 252 as shown in FIG. 8(a). With this motion, the upper slider 212 is moved leftward by virtue of the spring 228 and the measuring surface of the globe mold measuring element 219 is brought into abutment against the peripheral edge of the globe mold 112 as shown in FIG. 8(a).

In this state the base rotating motor 204 is rotated to move the globe mold measuring element 219 along the peripheral edge of the globe mold 112. The movement of the upper slider 212 is detected by the radius vector measuring means 217 and an output from the radius vector measuring element 217 is fed to an arithmetic and control circuit (not shown).

This arithmetic and control circuit determines a radius vector $\rho_i$ of the globe mold 112 on the basis of the output provided from the measuring means 217 and obtains radius vector information $(\theta_i, \rho_i)$ by making the radius vector $\rho_i$ corresponding to the rotational angle $\theta_i$ of the base rotating motor 204, then stores this globe mold shape information, i.e., radius vector information $(\theta_i, \rho_i)$ in memory (not shown).

(iii) Measuring the thickness of the to-be-machined lens on the basis of the globe mold shape information When the data requesting switch 81 in the lens edge grinder is turned ON, the globe shape information on the globe mold such as templet or demonstration lens, i.e., radius vector information $(\theta_i, \rho_i)$, or the globe shape information on the lens frame (globe mold shape) $(\theta_i, \rho_i, Z_i)$, is transmitted to and stored in the lens frame shape memory (globe mold shape memory) 90 in the lens edge grinder 2.

On the other hand, the lens L to be machined is pinched between the lens rotating shafts 304 and the lens thickness measuring switch 85 is turned ON. As a result, the arithmetic/decision circuit 91 causes the spacing between the feelers 332 and 334 to be widened largely by drive means (not shown) and turns ON the pulse motor 336 to let the feelers 332 and 334 face both front and rear refractive surfaces of the lens L to be machined. Thereafter, the expanding force for the feelers 332 and 334 by the drive means (not shown) is relieved, allowing the feelers 332 and 334 to come into abutment against both front and rear refractive surfaces of the lens L. Subsequently, on the basis of the globe mold shape information $(\theta_i, \rho_i, Z_i)$ or the radius vector information $(\theta_i, \rho_i)$ the arithmetic/decision circuit 91 turns ON the pulse motor 337 to rotate the lens rotating shafts 304, thereby rotating the lens L, and at the same time controls the operation of the pulse motor 336. At this time, on the basis of an output provided from the encoder 335 the arithmetic/decision circuit 91 determines the lens thickness $\Delta i$ in the globe mold shape information $(\theta_i, \rho_i, Z_i)$ or the radius vector information $(\theta_i, \rho_i)$ as globe mold shape information and stores it in the machining data memory 95.

Modification of Measuring Means

Although in FIG. 9 the feelers 332 and 334 are provided separately movably and the lens L to be machined is pinched between the feelers 332 and 834, thereby permitting measurement of the lens thickness, limitation is not always made to this configuration.

For example, a modification may be made as in FIG. 14, in which the two feelers 332 and 334 are rendered integral with the support member 333A so as to be movable together in a direction of the optical axis OL, and movement quantities of the feelers 332 and 334 are detected by a single encoder 333. In this case, the spacing, fx, between the two feelers 332 and 334 is set to a spacing (a predetermined spacing) sufficiently larger than an estimated thickness of the lens L.

The support member 333A is held so as to be movable forward and backward in only the right and left direction of the stage 331. Besides, springs S1 and S2 positioned on the left and right sides of the support member 333A are interposed between the support member 333A and the stage 331. When the feelers 332 and 334 are not in contact with the lens L to be machined, that is, when measurement is not conducted, the springs S1 and S2 act to hold the support member 333A nearly centrally in the range of right and left movements. The stage 331 is mounted to a body which holds a carriage (not shown) so as to be movable forward and backward with respect to the lens rotating shafts 304 and is moved forward and backward relative to the lens rotating shafts 304 by means of the pulse motor 336 which is attached to the said body. The carriage and the lens rotating shafts 304 are advanced and retreated in the right and left direction (axial direction of the lens rotating shafts 304) by means of a pulse motor PM.

In FIG. 14, in the measurement of edge thickness, the arithmetic/decision circuit 91 controls the operation of the pulse motor PM to move the to-be-machined lens L in the right and left direction and turns OFF the pulse motor PM when the lens L faces between the feelers 332 and 334. Next, the arithmetic/decision circuit 91 controls the operation of the pulse motor 336 to move the stage 331 toward the lens rotating shafts 304, allowing the lens L to be positioned between the feelers 332 and 334. In this case, the lens rotating shafts 304 are rotated by the pulse motor 337 so that the tips of the feelers 332 and 334 assume an initial position in radius vector information $(\theta_i, \rho_i)$, i.e., the position at the rotational angle $\theta_0$ in radius vector information $(\theta_0, \rho_0)$. At the rotational angle $\theta_0$, by controlling the operation of the pulse motor 336, the stage 331 and the feelers 332, 334 are moved toward the lens rotating shafts 304 up to a position in which the tips of the feelers 332 and 334 correspond to the radius vector $\rho_0$ of the lens L to be machined.

In this state, by controlling the operation of a pulse motor PM1 which causes the carriage (not shown) to move right and left, thereby causing the carriage, the lens rotating shafts 304 and the lens L to move right and left, it is possible to let the feeler 332 come into contact with the front refractive surface fa of the lens L or let the feeler 884 come into contact with the rear refractive surface fb of the lens. This control is performed by the arithmetic/decision circuit 91.

In this way the arithmetic/decision circuit 91 first causes one feeler 382 to come into contact with the front refractive surface fa of the lens L to be measured.

Then, the arithmetic/decision circuit 91 causes the rotary shafts 304 to rotate and determines coordinates or position of in the optical axis OL direction of the front refractive surface fa of the lens L in radius vector information ($\theta_i$, $\rho_i$) on the basis of an output signal (measurement signal) from the encoder 333 and a drive quantity of the pulse motor PM1. More specifically, when the rotary shafts 304 are rotated to start the edge thickness measurement, the arithmetic/decision circuit 91 controls the operation of the pulse motor 336 on the basis of radius vector $\rho_i$ at every rotational angle $\theta_i$ to move the stage 331 and the feeler 332 forward and backward integrally with respect to the optical axis OL, thereby adjusting the distance from the optical axis OL to the position of contact of the feeler 832 with the lens L to the radius vector $\rho_i$, and determines coordinates or position in the optical axis OL direction of the front refractive surface fa of the lens L in radius vector information ($\theta_i$, $\rho_i$), as fai, from the output signal (measurement signal) of the encoder 333 and the drive quantity of the pulse motor PM1.

Next, the arithmetic/decision circuit 91 causes the other feeler 334 to contact the rear refractive surface fb of the lens L in the manner described above. The arithmetic/decision circuit 91 then causes the rotary shafts 304 to rotate and determines coordinates or position in the optical axis OL direction of the rear refractive surface fb of the lens L in radius vector information ($\theta_i$, $\rho_i$) from an output signal (measurement signal) of the encoder 383 and a drive quantity of the pulse motor PM1. To be more specific, when the rotary shafts 304 are rotated to start the edge thickness measurement, the arithmetic/decision circuit 91 controls the operation of the pulse motor 336 on the basis of the radius vector $\rho_i$ at every rotational angle $\theta_i$ of the rotary shafts 304 to move the stage 331 and the feeler 332 forward and backward integrally with respect to the optical axis OL, thereby adjusting the distance from the optical axis OL to the position of contact of the feeler 332 with the lens L to the radius vector $\rho_i$, and determines coordinates or position in the optical axis OL direction of the rear refractive surface fb of the lens L in radius vector information ($\theta_i$, $\rho_i$), as fbi, from the output signal (measurement signal) of the encoder 333 and the drive quantity of the pulse motor PM1.

Thereafter, the arithmetic/decision circuit 91 determines the spacing between the front refractive surface fa and the rear refractive surface fb of the lens L in radius vector information ($\theta_i$, $\rho_i$), as edge thickness Wi=|fai−fbi|. According to this configuration, since the edge thickness can be measured by a single encoder 333, the stage 331 can be made small in size and can be installed more easily into the apparatus. Besides, since one encoder which is expensive can be omitted, it is possible to reduce the entire cost.

Second Embodiment

Although in the above embodiment the measuring force of the measuring element 216 is electrically controlled with use of the drive motor 401 and the microswitches 404 and 405, this does not always constitute any limitation.

For example, as shown in FIG. 15, the measuring force of the measuring element 216 may be switched over manually. In FIG. 15, a lower end portion of a crank-like measuring pressure switching lever (measuring pressure adjusting lever) 500 as a manual measuring force changing means (manual measuring force adjusting means) is positioned on the support plate 208 side and is held by the rotary base 202 through a support shaft 501. With the support shaft 501 as fulcrum, an upper end side of the measuring pressure switching lever 500 pivotally moves forward and backward with respect to the support plates 207 and 208. A spring retaining pin 500a is projected from an intermediate part of the measuring pressure switching lever 500 and the spring 228 is anchored to the spring retaining pin 500a. With the spring 228, the measuring pressure switching lever 500 is constantly urged leftward pivotally in FIG. 15 and FIG. 17.

An L-shaped lever retaining plate 502 is fixed to an upper end portion of the support plate 208. The plate 502 has a plate portion 502a extending horizontally toward the support plate 207. As shown in FIG. 16, a lever insertion hole 503 is formed in the plate portion 502a and an upper portion of the measuring pressure switching lever 500 is inserted into the lever insertion hole 503. The lever insertion hole 503 is formed with two lever retaining portions 503a and 503b spacedly in a direction away from the support plate 208.

Further, microswitches 504 and 505 are provided for detecting that the measuring pressure switching lever 500 is locked by the lever retaining portions 503a and 503b, and lever detection signals provided from the microswitches 504 and 505 are fed to the arithmetic and control circuit 270.

A liquid crystal display or a loudspeaker (neither shown) is provided in the measuring apparatus body 10 and in the case where the rim width of the lens frame measured in the foregoing A. is smaller than the predetermined value and hence the lens frame is apt to be deformed, the arithmetic and control circuit 270 informs a measurement worker to this effect using the liquid crystal display or the loudspeaker (neither shown), instructing the worker to the effect that the measuring force should be changed.

Next, reference will be made below to the operation of this embodiment constructed as above.

When the measuring pressure switching lever 500 is locked by the lever retaining portion 503a, the force of pulling the spring 228 is large and the measuring force of the measuring element 216 is large. On the other hand, when the measuring pressure switching lever 500 is locked by the lever retaining portion 503b, the force of pulling the spring 228 is small and the measuring force of the measuring element 216 is small.

In the case where the rim width of the lens frame measured in the foregoing A. is larger than the predetermined value and the lens frame is an ordinary type of a lens frame difficult to be deformed even with a large measuring force, the arithmetic and control circuit 270 informs the measurement worker to that effect using the liquid crystal display or the loudspeaker, instructing the worker to the effect that the measuring force should be changed. Preferably, in accordance with this instruction the worker causes the measuring pressure switching lever 500 to be locked by the lever retaining portion 503a and direct the lever in the vertical direction as in FIG. 15 to increase the measuring force of the measuring element 216. In this case, if there is no detected signal from the microswitch 505, the arithmetic and control circuit 270 again instructs the worker to the effect that the measuring force should be changed. If the start button 13 is turned ON after receipt of a detection signal from the microswitch 505, the arithmetic and control circuit 270 makes control to start measurement.

In the case of a lens frame whose rim width measured in the foregoing A. is smaller than the predetermined value and which is likely to be deformed under the action of a large measuring force, the arithmetic and control circuit 270 informs the measurement worker to that effect using the liquid crystal display or the loudspeaker, instructing the worker to the effect that the measuring force should be changed. Preferably, in accordance with this instruction the worker causes the measuring pressure switching lever 500 to be locked by the lever retaining portion 503b and causes the lever to be inclined in a direction away from the support plate 208 as in FIG. 17, thereby decreasing the measuring force of the measuring element 216. In this case, if there is no detection signal from the microswitch 504, the arithmetic and control circuit 207 again instructs the worker to the effect that the measuring force should be changed. If the start button 13 is turned ON after receipt of a detection signal from the microswitch 504, the arithmetic and control circuit 270 makes control to start measurement.

A modification may be made such that when the spacing between upper and lower rims of the lens frame measured is smaller than the predetermined value, as shown in the foregoing C., and the arithmetic and control circuit 270 judges that the lens frame is a lens frame for half glasses, the arithmetic and control circuit informs the worker to that effect using the liquid crystal display or the loudspeaker, instructing the worker to the effect that the measuring force should be changed large. Preferably, in accordance with this instruction the worker causes the measuring pressure switching lever 500 to be locked by the lever retaining portion 503*b* and causes the lever to be inclined in a direction away from the support plate 208 as shown in FIG. 17, thereby decreasing the measuring force of the measuring element 216. In this case, if there is no detection signal from the microswitch 504, the arithmetic and control circuit 270 again instruct the worker that the measuring force should be changed. Then, if the start button 13 is turned ON after receipt of a detection signal from the microswitch 504, the arithmetic and control circuit 270 makes control to start measurement.

As set forth above, in the lens frame shape measuring apparatus according to the present invention, a contact element supported by a contact element moving mechanism is brought into abutment against a groove formed in an inner peripheral surface of a lens frame of glasses and is moved along the said groove to measure the shape of the lens frame by a moving position of the contact element, the apparatus comprising a contact element moving distance detecting means for detecting a moving distance of the contact element when the contact element is moved from a movement start position at the center of the lens frame up to a central position in the right and left direction of a lower rim of the lens frame and is brought into contact with the lower rim, and a measurement control means which identifies a lens frame shape of the glasses by the moving distance detected by the contact element moving distance detecting means and which controls a contact measurement state of the contact element for the lens frame in accordance with a measurement sequence corresponding to the thus-identified lens frame shape. According to this configuration, a lens frame shape of glasses is identified on the basis of the distance from a movement start position of the contact element at the center of the lens frame up to a lens frame measurement start position at which the contact element is first brought into abutment against the lens frame, i.e., a vertical moving distance of the contact element as seen from the front side of the lens frame in the measurement, and it can be used in judging whether contact measurement conditions such as the rotating speed and direction of the contact element or the measuring pressure should be changed or not (a lens frame shape measuring sequence should be changed or not). Further, it is possible to realize a complete automation of lens frame shape measurement without human assistance.

The contact element moving mechanism may comprise a slide base capable of moving forward and backward horizontally, a measuring section moving motor for moving the slide base forward and backward horizontally, a rotary base held by the slide base horizontally rotatably, a base rotating motor for rotating the rotary base, an upper slider mounted to the rotary base so as to be movable forward and backward horizontally and holding the contact element vertically movably, and a spring which urges the upper slider in either the forward direction or the backward direction, and the measurement control means may control the operation of the base rotating motor and thereby control the state of movement of the contact element for the lens frame as the foregoing contact measurement state in accordance with the measurement sequence corresponding to the identified lens frame shape. According to this configuration, such contact measurement conditions as the rotating speed and direction of the contact element or the measuring pressure can be adjusted easily.

The contact element moving mechanism may comprise a slide base capable of moving forward and backward horizontally, a measuring section moving motor for moving the slide base forward and backward horizontally, a rotary base held by the slide base horizontally rotatably, a base rotating motor for rotating the rotary base, a lower slider mounted to the rotary base horizontally movably, a drive motor for moving the lower slider forward and backward horizontally, an upper slider mounted to the rotary base so as to be movable forward and backward horizontally and holding the contact element vertically movably, and a spring which urges the upper slider in either the forward direction or the backward direction, and the measurement control means may control the operation of the drive motor and thereby control a contact pressure of the contact element against the lens frame as the foregoing contact measurement state in accordance with the measurement sequence corresponding to the identified lens frame shape. According to this configuration wherein the state of movement of the contact element relative to the lens frame is controlled as the foregoing contact measurement state in accordance with the measurement sequence corresponding to the identified lens frame shape, the rotating speed and direction of the contact element can be changed at a portion of the glasses lens frame shape where the radius of curvature changes largely and the pressure of contact between the contact element and the lens frame is large.

The contact element moving mechanism may comprise a slide base capable of moving forward and backward horizontally, a measuring section moving motor for moving the slide base forward and backward horizontally, a rotary base held by the slide base horizontally rotatable, a base rotating motor for rotating the rotary base, a lower slider mounted to the rotary base horizontally movably, a drive motor for moving the lower slider forward and backward horizontally, an upper slider mounted to the rotary base so as to be movable forward and backward horizontally and holding the contact element vertically movably, and a spring which urges the upper slider in either the forward direction or the backward direction, and the measurement control means may control the operation of the base rotating motor and thereby control the state of movement of the contact element for the lens frame as the foregoing contact measurement state in accordance with the measurement sequence corresponding to the identified lens frame shape, and at the same time the measurement control means may control the operation of the drive motor and thereby control a contact pressure of the contact element for the lens frame as the foregoing contact measurement state in accordance with the measurement sequence corresponding to the identified lens frame shape. According to this configuration, the rotating speed and direction of the contact element can be changed at a portion of glasses lens frame shape where the radius of curvature is changes largely and the pressure of contact of the contact element with the lens frame is large. Besides, according to the configuration wherein the state of movement of the contact element for the lens frame is controlled as the foregoing contact measurement state in accordance with the measurement sequence corresponding to the identified lens frame shape, such contact measurement conditions as the rotating speed and direction of the contact element or the measuring pressure can be adjusted easily.

Further, the measurement control means may identify the lens frame to be a lens frame for half glasses when the moving distance detected by the contact element moving distance detecting means is smaller than a preset value. According to this configuration, it is possible to discriminate easily and rapidly whether the lens frame to be measured is a lens frame for half glasses or not.

Further, the measurement control means may be constructed such that when it judges that the lens frame is a lens frame for half glasses, it controls to decrease the rotating speed of the contact element relative to the rotating speed thereof for normal lens frame measurement, thereby creating a contact measurement state in which the contact element does not exert an abrupt deforming force on the lens frame when the measuring element moves along and in contact with the lens frame. According to this configuration, it is possible to accurately measure the shape of the lens frame for half glasses.

Further, the measurement control means may be constructed such that when it judges that the lens frame to be a lens frame for half glasses, it controls to decrease the rotating speed of the contact element at a position on a nose or ear contacting side of the lens frame of glasses, thereby creating a contact measurement state in which an abrupt deforming force is not exerted on the lens frame when the contact element moves in contact with the lens frame at a position on the nose or ear contacting side of the lens frame of glasses. According to this configuration, for example in the case of a glasses lens frame whose rim width is narrow in a direction perpendicular to the optical axis of the glasses lens to be fitted in the lens frame, as a kind of a half glasses lens frame whose width in the vertical direction as seen from the front side of the lens frame is extremely narrow, it is possible to provide a lens frame shape measuring apparatus capable of measuring the lens frame shape accurately without deforming the lens frame on the nose or ear contacting side.

The measurement control means may be constructed such that when it judges that the lens frame is a lens frame for half glasses and that right and left portions of a lower rim of the lens frame are curved largely, while right and left portions of an upper rim of the lens frame are curved to a small extent, it controls to let the contact element move in contact with the lens frame while allowing the contact element to rotate from the lower rim toward the upper rim on the nose contacting side, thereby creating a contact measurement state in which the upper rim does not undergo an abrupt deforming force from the contact element on the ear contacting side. According to this configuration, the ear contacting side of the upper rim which is apt to be deformed under the measuring pressure does not undergo any abrupt deforming force from the contact element, so it is possible to provide a lens frame shape measuring apparatus capable of measuring the shape of a lens frame accurately deformation of the ear contacting side of the lens frame.

Further, the measurement control means may be constructed such that the operation of each of the motors is controlled, allowing the contact element to measure both an outer peripheral surface of the lens frame and the lens frame groove, allowing the position of the outer peripheral surface of the lens frame and the position of the lens frame groove to be determined in accordance with measurement signals provided from the contact element moving distance detecting means, a difference between the position of the outer peripheral surface of the lens frame and the position of the lens frame groove is determined as a rim width, and if the rim width thus determined is smaller than a predetermined value and hence the lens frame is apt to be deformed, the operation of the drive motor is controlled to diminish the pressure of contact of the contact element with the lens frame which contact is ensured by the spring. According to this configuration, the contact pressure (measuring pressure) of the contact element against the lens frame can be adjusted automatically in accordance with the rim width of the lens frame.

Further, the contact element moving mechanism may comprise a slide base capable of moving forward and backward horizontally, a measuring section moving motor for moving the slide base forward and backward horizontally, a rotary base held by the slide base horizontally rotatably, a base rotating motor for rotating the rotary base, an upper slider mounted to the rotary base so as to be movable forward and backward horizontally and holding the contact element vertically movably, a spring which urges the upper slider in either the forward direction or the backward direction, and a manual measurement force changing means which changes over the upper slider urging force of the spring to change over the contact pressure of the contact element against the lens frame. According to this configuration, the contact pressure (measuring pressure) of the contact element against the lens frame can be switched and adjusted in accordance with the rim width of the lens frame.

What is claimed is:

1. A lens frame shape measuring apparatus wherein a contact element, is brought into abutment against a groove formed in an inner peripheral surface of a lens frame of glasses, and is moved along said groove to measure a shape of said lens frame, said apparatus comprising:

a contact element moving distance detecting means for detecting a moving distance of said contact element by moving said contact element from one point to another point on said lens frame; and a measurement control means which identifies the lens frame shape of the glasses by said moving distance detected by said contact element moving distance detecting means, and which changes a measurement condition of said contact element with respect to the lens frame in accordance with a measurement sequence corresponding to the thus-identified lens frame shape.

2. A lens frame shape measuring apparatus according to claim 1, wherein:

said contact element moving mechanism comprises a slide base capable of moving forward and backward horizontally, a measuring section moving motor for moving said slide base forward and backward horizontally, a rotary base held by said slide base horizontally rotatably, a base rotating motor for rotating said rotary base, an upper slider mounted to the rotary base so as to be movable forward and backward horizontally and holding said contact element vertically movably, and a spring which urges said upper slider in either the forward direction or the backward direction; and said measurement control means controls the operation of said base rotating motor and thereby controls the state of movement of said contact element for the lens frame as said contact measurement state in accordance with the measurement sequence corresponding to the identified lens frame shape.

3. A lens frame shape measuring apparatus according to claim 1, wherein:

said contact element moving mechanism comprises a slide base capable of moving forward and backward horizontally, a measuring section moving motor for moving said slide base forward and backward horizontally, a rotary base held by said slide base horizontally rotatably, a base rotating motor for rotating said rotary base, a lower slider mounted to said rotary base horizontally movably, a drive motor for moving said lower slider forward and backward horizontally, an upper slider mounted to said rotary base so as to be movable forward and backward horizontally and holding said contact element vertically movably, and a spring which urges said upper slider in either the forward direction or the backward direction; and said measurement control means controls the operation of said drive motor and thereby controls a contact pressure of said contact element against the lens frame as said contact measurement state in accordance with the measurement sequence corresponding to the identified lens frame shape.

4. A lens frame shape measuring apparatus according to claim 3, wherein said measurement control means is constructed such that the operation of each of said motors is controlled, allowing said contact element to measure both an outer peripheral surface of said lens frame and said lens frame groove, allowing the position of the outer peripheral surface of said lens frame and the position of said lens frame groove to be determined in accordance with measurement signals provided from said contact element moving distance detecting means, a difference between the position of the outer peripheral surface of the lens frame and the position of the lens frame groove is determined as a rim width, and if the rim width thus determined is smaller than a predetermined value and hence the lens frame is apt to be deformed, the operation of said drive motor is controlled to diminish the contact pressure of said contact element against the lens frame which contact is ensured by said spring.

5. A lens frame shape measuring apparatus according to claim 1, wherein:

said contact element moving mechanism comprises a slide base capable of moving forward and backward horizontally, a measuring section moving motor for moving said slide base forward and backward horizontally, a rotary base held by said slide base horizontally rotatably, a base rotating motor for rotating said rotary base, a lower slider mounted to said rotary base horizontally movably, a drive motor for moving said lower slider forward and backward horizontally, an upper slider mounted to said rotary base so as to be movable forward and backward horizontally and holding said contact element vertically movably, and a spring which urges said upper slider in either the forward direction or the backward direction; and said measurement control means controls the operation of said base rotating motor and thereby controls the state of movement of said contact element for the lens frame as said contact measurement state in accordance with the measurement sequence corresponding to the identified lens frame shape, and at the same time said measurement control means controls the operation of said drive motor and thereby controls a contact pressure of said contact element against the lens frame as said contact measurement state in accordance with the measurement sequence corresponding to the identified lens frame shape.

6. A lens frame shape measuring apparatus according to claim 1, wherein said measurement control means identifies the lens frame to be a lens frame for half glasses when the moving distance detected by said contact element moving distance detecting means is smaller than a preset value.

7. A lens frame shape measuring apparatus according to claim 6, wherein said measurement control means controls the contact element in such a manner that when the said control means judges that the lens frame is a lens frame for half glasses, said contact element does not exert an abrupt deforming force on said lens frame by decreasing the rotating speed of said contact element relative to the rotating speed thereof for normal lens frame measurement.

8. A lens frame shape measuring apparatus according to claim 6, wherein said measurement control means controls the contact element in such a manner that when the control means judges the lens frame to be a lens frame for half glasses, said contact element moves in contact with the lens frame at a position of a nose or an ear contacting side of the lens frame of glasses, an abrupt deforming force is not exerted on the lens frame by decreasing the rotating speed of said contact element at the position on the nose or the ear contacting side of the lens frame of glasses.

9. A lens frame shape measurement apparatus according to claim 6, wherein said measurement control means controls the contact element in such a manner that when the control means judges that the lens frame is a lens frame for half glasses and that right and left portions of a lower rim of the lens frame are curved largely, while right and left portions of an upper rim of the lens frame are curved to a small extent, said upper rim does not undergo an abrupt deforming force from said contact element on the ear contacting side by controlling to let said contact element move in contact with the lens frame while allowing the contact element to rotate from said lower rim to said upper rim on the nose contacting side.

10. A lens frame shape measuring apparatus according to claim 1, wherein said contact element moving mechanism comprises a slide base capable of moving forward and backward horizontally, a measuring section moving motor for moving said side base forward and backward horizontally, a rotary base held by said slide base horizontally rotatably, a base rotating motor for rotating said rotary base, an upper slider mounted to said rotary base so as to be movable forward and backward horizontally and holding said contact element vertically movably, a spring which urges said upper slider in either the forward direction or the backward direction, and a manual measurement force changing means which changes over the upper slider urging force of said spring to change over the contact pressure of said contact element against the lens frame.

* * * * *